(12) United States Patent
Kataoka et al.

(10) Patent No.: US 10,654,245 B2
(45) Date of Patent: May 19, 2020

(54) DECORATIVE SHEET AND DECORATIVE RESIN MOLDED ARTICLE

(71) Applicant: Dai Nippon Printing Co., Ltd., Tokyo (JP)

(72) Inventors: Sakie Kataoka, Tokyo (JP); Emi Hirose, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 15/024,217

(22) PCT Filed: Sep. 29, 2014

(86) PCT No.: PCT/JP2014/075972
§ 371 (c)(1),
(2) Date: Mar. 24, 2016

(87) PCT Pub. No.: WO2015/046549
PCT Pub. Date: Apr. 2, 2015

(65) Prior Publication Data
US 2016/0214345 A1 Jul. 28, 2016

(30) Foreign Application Priority Data

Sep. 30, 2013 (JP) ................. 2013-204239
Mar. 28, 2014 (JP) ................. 2014-070292
Mar. 28, 2014 (JP) ................. 2014-070293

(51) Int. Cl.
*B32B 3/30* (2006.01)
*B32B 27/30* (2006.01)
(Continued)

(52) U.S. Cl.
CPC .............. *B32B 3/30* (2013.01); *B32B 7/12* (2013.01); *B32B 27/08* (2013.01); *B32B 27/302* (2013.01);
(Continued)

(58) Field of Classification Search
CPC ......... B32B 3/30; B32B 7/02; B32B 2451/00; B32B 27/16; B32B 2307/584;
(Continued)

(56) References Cited

U.S. PATENT DOCUMENTS

2009/0246475 A1 10/2009 Hirata et al.
2014/0205801 A1 7/2014 Iwata et al.
(Continued)

FOREIGN PATENT DOCUMENTS

CN 101544157 A 9/2009
JP 2000-326446 A 11/2000
(Continued)

OTHER PUBLICATIONS

Translation of JP2011073373 A; published Apr. 14, 2011.*
(Continued)

*Primary Examiner* — Catherine A. Simone
(74) *Attorney, Agent, or Firm* — Locke Lord LLP

(57) ABSTRACT

The purpose of the present invention is to provide a decorative sheet having a bulging section on the surface thereof, wherein the bulging section is effectively inhibited from cracking during molding, and the decorative sheet is imparted with exceptional scratch resistance and quality of design in the convex/concave features on the bulging section after molding. The present invention pertains to a decorative sheet having a bulging section formed by a cured product of an ionizing-radiation-curable resin composition on a substrate sheet, the cured product of the ionizing-radiation-curable resin composition having a Martens hardness in a range of 10-120 N/mm² at a temperature of 25° C. and a relative humidity of 50%.

19 Claims, 4 Drawing Sheets

(51) Int. Cl.
  *B32B 27/08* (2006.01)
  *B32B 27/32* (2006.01)
  *B32B 27/36* (2006.01)
  *B32B 27/40* (2006.01)
  *C09D 5/28* (2006.01)
  *C09D 11/101* (2014.01)
  *B32B 7/12* (2006.01)
  *C09D 11/106* (2014.01)

(52) U.S. Cl.
  CPC .......... *B32B 27/306* (2013.01); *B32B 27/308* (2013.01); *B32B 27/32* (2013.01); *B32B 27/365* (2013.01); *B32B 27/40* (2013.01); *C09D 5/28* (2013.01); *C09D 11/101* (2013.01); *C09D 11/106* (2013.01); *B32B 2255/10* (2013.01); *B32B 2255/205* (2013.01); *B32B 2255/26* (2013.01); *B32B 2307/536* (2013.01); *B32B 2307/554* (2013.01); *B32B 2307/584* (2013.01); *B32B 2451/00* (2013.01)

(58) Field of Classification Search
  CPC ..... B32B 27/08; B32B 27/302; B32B 27/306; B32B 27/308; B32B 27/32; B32B 27/365; B32B 27/40
  See application file for complete search history.

(56) References Cited

U.S. PATENT DOCUMENTS

| | | | |
|---|---|---|---|
| 2014/0302293 | A1 | 10/2014 | Takano et al. |
| 2016/0200082 | A1 | 7/2016 | Awa et al. |

FOREIGN PATENT DOCUMENTS

| | | | | |
|---|---|---|---|---|
| JP | 2004-276416 | A | | 10/2004 |
| JP | 2006-123512 | A | | 5/2006 |
| JP | 2008-080718 | A | | 4/2008 |
| JP | 2008281614 | A | * | 11/2008 |
| JP | 2009-234159 | A | | 10/2009 |
| JP | 2012-215064 | A | | 11/2012 |
| JP | 2012213923 | A | * | 11/2012 |
| JP | 2013029828 | A | * | 2/2013 |
| JP | 2013-082216 | A | | 5/2013 |
| JP | 2014-159154 | A | | 9/2014 |
| JP | 2014-188845 | A | | 10/2014 |
| WO | 2012/133234 | A1 | | 10/2012 |
| WO | 2012/133402 | A1 | | 10/2012 |
| WO | 2015-046568 | A1 | | 4/2015 |

OTHER PUBLICATIONS

Translation of JP2012-213923A, published Nov. 8, 2012.*
Translation of JP2013-029828A, published Feb. 7, 2013.*
Translation of JP 2008-281614. (Year: 2008).*
Anonymous: "Instrumented Indentation", Science + Technology, Mass & Force—Hardness methods and sensitivity coefficients, National Physical Laboratory, Mar. 25, 2010, 2 pages. (cited in the May 8, 2017 EP Search Report).
Supplementary European Search Report dated May 8, 2017, issued for the European patent application No. 14848303.5.
International Search Report dated Jan. 6, 2015, issued for PCT/JP2014/075972.
Office Action dated Mar. 20, 2017, issued for Counterpart Chinese Patent Appln. No. 201480053940.5.
Office Action dated Nov. 17, 2017, issued for Counterpart Chinese Patent Application No. 201480053940.5.
Office Action dated Apr. 3, 2018, issued for Counterpart Japanese Patent Appln. No. 2014-070292.
Office Action dated Apr. 3, 2018, issued for Counterpart Japanese Patent Appln. No. 2014-070293.

* cited by examiner

DECORATIVE SHEET AND DECORATIVE RESIN MOLDED ARTICLE

TECHNICAL FIELD

The present invention relates to a decorative sheet including a convex area portion on a surface thereof, the convex area portion being effectively inhibited from cracking during molding, the decorative sheet exhibiting excellent scratch resistance and design property in the irregularity shape of the convex area portion after molding. The present invention relates to a decorative resin molded article obtained using the decorative sheet.

BACKGROUND ART

Decorative resin molded articles in which a decorative sheet is laminated on the surface of a resin molded article have been heretofore used in vehicle interior and exterior components, building interior materials, cases for home electric appliances, and the like. In production of such a decorative resin molded article, for example, a molding method is used in which a decorative sheet given a design beforehand is integrated with a resin by injection molding. Typical examples of the molding method include an insert molding method in which a decorative sheet is molded into a three-dimensional shape beforehand by a vacuum molding die, the decorative sheet is inserted into an injection molding die, and a fluidized resin is injected into the die to integrate the resin with the decorative sheet, and an injection molding simultaneous decorating method in which a decorative sheet inserted into a die in injection molding is integrated with a molten resin injected into a cavity.

As a method for imparting design property such as an irregularity feeling, a stereoscopic feeling or a depth feeling on the surface of such a decorative resin molded article, an attempt has been made to print a pattern on the back surface of a base material sheet, and form an irregularity shape on the surface of the base material sheet by embossing (stamping). However, when an irregularity shape is formed on the surface by embossing, the irregularity shape may be restored to a flat surface under the action of heat and stress during injection molding or preceding premolding (vacuum molding). Such an irregularity shape is formed of a thermoplastic resin, and therefore may be easily lost or damaged due to abrasion.

As a decorative sheet with an irregularity shape formed thereon by a method different from embossing, for example, Patent Document 1 discloses an irregularity insert sheet including a base material sheet, one surface of which is provided with at least a fine irregularity layer having a thickness of 2 μm or more and a pensile hardness of HB or more as measured by the test method specified in the Japanese Industrial Standards (JIS) K5400. For example, Patent Document 2 proposes that when the arrangement and size of convex area portions which form an irregularity shape on a surface of a molding decorative film are defined such that the total area of the convex area portions constitutes 45% or less of the area of the whole surface of a base material sheet, and the area of one convex area portion is 2 mm² or less, the problem of occurrence of cracking in the convex area portions is improved.

PRIOR ART DOCUMENTS

Patent Documents

Patent Document 1: Japanese Patent Laid-open Publication No. 2004-276416

Patent Document 2: Japanese Patent Laid-open Publication No. 2009-234159

SUMMARY OF THE INVENTION

Problems to be Solved by the Invention

According to the method disclosed in Patent Document 2, convex area portions can be inhibited from cracking, but for inhibiting cracking, the arrangement and size of the convex area portions which form an irregularity pattern are required to be limited to a range as described above, and thus further improvement is desired. In view of the circumstances described above, a main object of the present invention is to provide a decorative sheet including an convex area portion on a surface thereof, the convex area portion being effectively inhibited from cracking during molding, the decorative sheet exhibiting excellent scratch resistance and design property in the irregularity shape of the convex area portion after molding.

Means for Solving the Problem

In order to achieve the above-mentioned object, the present inventors have extensively conducted studies. As a result, it has been found that when in a decorative sheet including an convex area portion formed of a cured product of an ionizing radiation curable resin composition on a base material sheet, the cured product of an ionizing radiation curable resin composition is set at a Martens hardness of 10 to 120 N/mm² under a temperature of 25° C. and a relative humidity of 50%, the convex area portion is effectively inhibited from cracking during molding, and scratch resistance and design property in the irregularity shape of the convex area portion are exhibited after molding. The present invention is an invention that has been completed by further conducting studies based on the above-mentioned findings.

That is, the present invention provides inventions of aspects as listed below.

Item 1. A decorative sheet including an convex area portion formed of a cured product of an ionizing radiation curable resin composition on a base material sheet, wherein the cured product of an ionizing radiation curable resin has a Martens hardness of 10 to 120 N/mm² under a temperature of 25° C. and a relative humidity of 50%.

Item 2. The decorative sheet according to item 1, wherein the ionizing radiation curable resin composition in the convex area portion contains a urethane (meth)acrylate oligomer.

Item 3. The decorative sheet according to item 1 or 2, wherein the thickness of the convex area portion is 10 μm or more.

Item 4. The decorative sheet according to any one of items 1 to 3, wherein the total area of the convex area portion constitutes 90% or less of the area of the whole surface of the decorative sheet.

Item 5. The decorative sheet according to any one of items 1 to 4, wherein the plurality of convex area portions are mutually independent.

Item 6. The decorative sheet according to any one of items 1 to 5, wherein the plurality of convex area portions each have an area of 100 mm² or less when viewed in the lamination direction of the decorative sheet.

Item 7. The decorative sheet according to any one of items 1 to 6, including a surface protective layer between the base material sheet and the convex area portion, wherein the convex area portion is formed on a surface of the surface protective layer.

Item 8. The decorative sheet according to item 7, wherein the surface protective layer is formed of a cured product of an ionizing radiation curable resin composition.

Item 9. The decorative sheet according to item 7 or 8, wherein the content of a silicone component in the ionizing radiation curable resin composition in the surface protective layer is 5% by mass or less.

Item 10. The decorative sheet according to any one of items 7 to 9, wherein the ionizing radiation curable resin composition in the surface protective layer contains a polycarbonate (meth)acrylate.

Item 11. The decorative sheet according to item 10, wherein the weight average molecular weight of the polycarbonate (meth)acrylate is 5000 or more.

Item 12. The decorative sheet according to item 10 or 11, wherein the ionizing radiation curable resin composition in the surface protective layer further contains a urethane (meth)acrylate.

Item 13. The decorative sheet according to item 12, wherein the mass ratio of the polycarbonate (meth)acrylate and the urethane (meth)acrylate contained in the ionizing radiation curable resin composition in the surface protective layer is 50:50 to 99:1.

Item 14. The decorative sheet according to any one of items 7 to 13, wherein the thickness of the surface protective layer is 1 to 50 μm.

Item 15. The decorative sheet according to any one of items 1 to 14, further including a decorative layer.

Item 16. The decorative sheet according to any one of items 1 to 15, including a support sheet on the base material sheet on a side opposite to the convex area portion.

Item 17. A decorative resin molded article in which a molded resin layer, a base material sheet, and an convex area portion formed of a cured product of an ionizing radiation curable resin composition on the base material sheet are laminated in this order, wherein
the cured product of an ionizing radiation curable resin composition in the convex area portion has a Martens hardness of 10 to 120 N/mm² under a temperature of 25° C. and a relative humidity of 50%.

Item 18. The decorative resin molded article according to item 17, including a surface protective layer between the base material sheet and the convex area portion, wherein the convex area portion is formed on a surface of the surface protective layer.

Advantages of the Invention

According to the present invention, there can be provided a decorative sheet in which the convex area portion is effectively inhibited from cracking during molding, and the decorative sheet exhibits excellent scratch resistance and design property in the irregularity shape of the convex area portion after molding.

EMBODIMENTS OF THE INVENTION

1. Decorative Sheet

Figure 1:
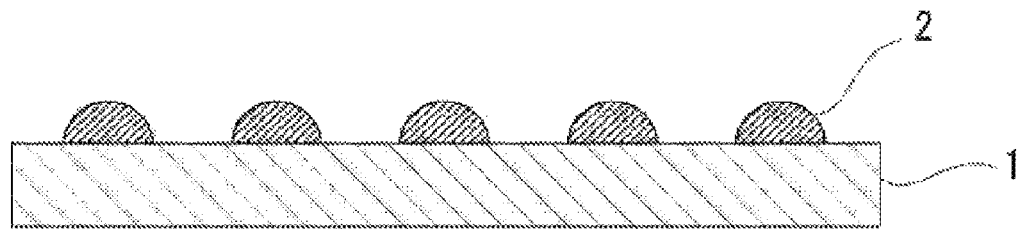
FIG. 1 is a schematic sectional view of one example of a decorative sheet of the present invention.

A decorative sheet of the present invention includes an convex area portion formed of a cured product of an ionizing radiation curable resin composition on a base material sheet, wherein the cured product of an ionizing radiation curable resin has a Martens hardness of 10 to 120 N/mm² under a temperature of 25° C. and a relative humidity of 50%. In the decorative sheet of the present invention, the cured product of an ionizing radiation curable resin composition for forming the convex area portion has a Martens hardness of 10 to 120 N/mm² under a temperature of 25° C. and a relative humidity of 50%, so that the convex area portion is effectively inhibited from cracking during molding, and the decorative sheet exhibits excellent scratch resistance and design property in the irregularity shape of the convex area portion after molding. More specifically, in the decorative sheet of the present invention, the convex area portion is formed of a cured product of an ionizing radiation curable resin composition which has a Martens hardness in the above-mentioned specific range, and therefore the convex area portion has moderate flexibility, so that the convex area portion is effectively inhibited from cracking during molding. Further, the convex area portion having such a Martens hardness also has moderate elasticity, and therefore even when the decorative sheet is heated and pressurized during molding, the shape of the convex area portion is suitably retained, so that the decorative sheet exhibits excellent design property in the irregularity shape of the convex area portion after during. Further, the convex area portion having such a Martens hardness also has excellent scratch resistance because it is formed of a cured product of an ionizing radiation curable resin composition. As described later, the decorative sheet according to the present invention may have no decorative layer, masking layer etc., and may be, for example, transparent. Hereinafter, the decorative sheet of the present invention will be described in detail.

Laminated Structure of Decorative Sheet

The decorative sheet of the present invention has a laminated structure in which convex area portions 2 are formed on a base material sheet 1. In the decorative sheet of the present invention, an irregularity shape is formed on a surface of the decorative sheet by the convex area portions 2 on the base material sheet 1 as shown in, for example, FIGS. 1 to 3.

In the decorative sheet of the present invention, a support sheet 3 may be provided as necessary for the purpose of, for example, improving the moldability of the decorative sheet. A decorative layer 4 may be provided as necessary for the purpose of, for example, imparting decorativeness to the decorative resin molded article. A masking layer may be provided as necessary for the purpose of, for example, suppressing a change and variation in color of the decorative sheet. Further, a surface protective layer 5 may be provided between the base material sheet 1 and the convex area portions 2 as necessary for the purpose of, for example, improving the scratch resistance and chemical resistance of the decorative resin molded article. In the case where the surface protective layer 5 is provided, a primer layer 6 may be provided as necessary for the purpose of, for example, improving adhesion between the surface protective layer 5 and a layer situated thereunder (on a side opposite to the convex area portions 2). An adhesive layer 7 may be provided as necessary for the purpose of, for example, improving adhesion between the decorative sheet and a molded resin layer 8.

Figure 2:
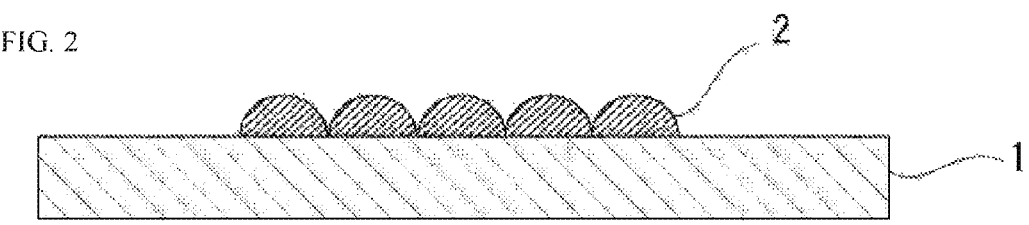
FIG. 2 is a schematic sectional view of one example of a decorative sheet of the present invention.
Figure 3:
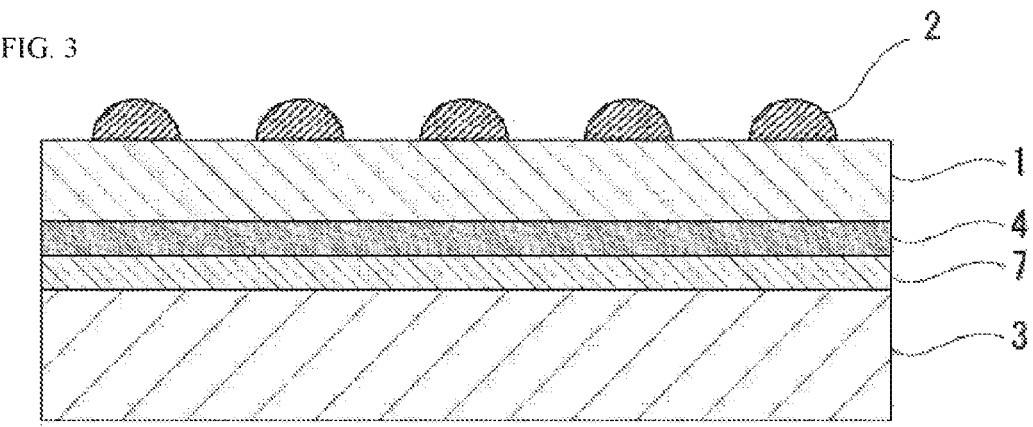
FIG. 3 is a schematic sectional view of one example of a decorative sheet of the present invention.
Figure 4:
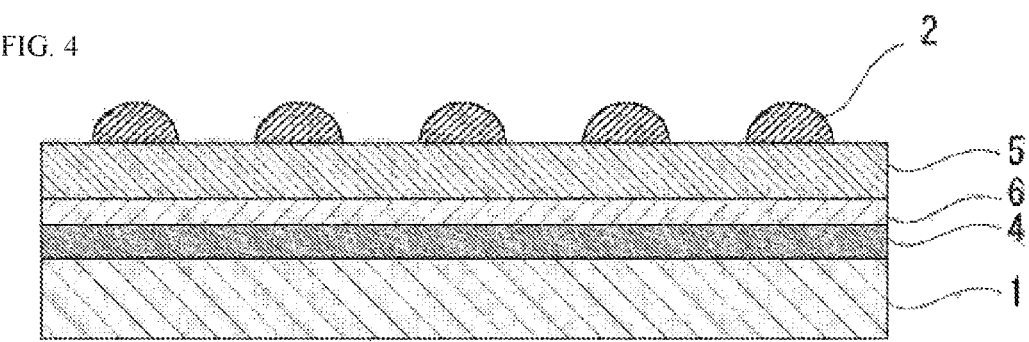
FIG. 4 is a schematic sectional view of one example of a decorative sheet of the present invention.

Examples of the laminated structure of the decorative sheet of the present invention include a laminated structure in which a base material sheet and convex area portions are laminated in this order; a laminated structure in which an adhesive layer, a decorative layer, a base material sheet and convex area portions are laminated in this order; a laminated structure in which a support sheet, a decorative layer, a base material sheet and convex area portions are laminated in this order; a laminated structure in which a base material sheet, a decorative layer, a primer layer, a surface protective layer and convex area portions are laminated in this order: a laminated structure in which a decorative layer, a base material sheet, a surface protective layer and convex area portions are laminated in this order; and a laminated structure in which an adhesive layer, a support sheet, a decorative layer, a base material sheet and convex area portions are laminated in this order. As one aspect of the laminated structure of the decorative sheet of the present invention, FIGS. 1 and 2 shows a schematic sectional view of one example of a decorative sheet in which a base material sheet and convex area portions are laminated in this order. As one aspect of the laminated structure of the decorative sheet of the present invention, FIG. 3 shows a schematic sectional view of one example of a decorative sheet in which a support sheet, an adhesive layer, a decorative layer, a base material sheet and convex area portions are laminated in this order. As one aspect of the laminated structure of the decorative sheet of the present invention, FIG. 4 shows a schematic sectional view of one example of a decorative sheet in which a base material sheet, a decorative sheet, a primer layer, a surface protective layer and convex area portions are laminated in this order.

Compositions of Layers Forming Decorative Sheet

[Base Material Sheet 1]

The base material sheet 1 is a layer that serves as a base material of the decorative sheet, and in the case where the base material sheet 1 is provided on the surface side of the decorative sheet, the later-described convex area portions 2 are formed on a surface of the base material sheet 1. When the decorative sheet includes the surface protective layer 5 between the base material sheet 1 and the convex area portions 2, the convex area portions 2 are formed on a surface of the surface protective layer 5 as described later.

The base material sheet 1 is formed of a resin. The resin for forming the base material sheet is not particularly limited, and examples thereof include thermoplastic resins and thermosetting resins.

Specific examples of the thermoplastic resin for forming the base material sheet 1 include acrylic resins such as polymethyl (meth)acrylate and polyethyl (meth)acrylate; polyolefin-based resins such as polypropylene and polyethylene; polycarbonate resins; polyvinyl chloride-based resins; polyester resins such as polyethylene terephthalate (PET): acrylonitrile-butadiene-styrene resins (ABS resins); and acrylonitrile-styrene-acrylic acid ester resins. In the case where the base material sheet 1 is provided on the surface side (convex area portion 2 side) of the decorative sheet, and the convex area portions 2 are formed on the base material sheet 1, acrylic resins are preferable among the above-mentioned resins for effectively inhibiting the convex area portions 2 from cracking during molding, and further improving design property in the irregularity shape of the convex area portions 2 after molding. On the other hand, in the case where the base material sheet 1 is provided on the back surface side (on a side opposite to the convex area portions 2) of the decorative sheet, ABS resins are preferable among the above-mentioned resins from the viewpoint of moldability etc. The thermoplastic resins may be used alone, or may be used in combination of two or more thereof.

The thermosetting resin for forming the base material sheet 1 is not particularly limited, and examples thereof include polyol resins such as acryl polyols; polyester polyols; urethane polyols such as polyester urethane polyols and acryl urethane polyols; and polyolefin polyols such as polyethylene polyols, polypropylene polyols, polybutadiene polyols and polyisoprene polyols. Among the above-mentioned resins, acryl polyols are preferable for improving the moldability of the decorative sheet. Examples of the preferred acryl polyol include those shown as an example for the later-described primer layer 6. The thermosetting resins may be used alone, or may be used in combination of two or more thereof.

As the base material sheet 1, a resin sheet formed of a resin as described above can be used. The thickness of the base material sheet 1 is not particularly limited, and is appropriately set according to, for example, a use purpose of the decorative sheet or a position at which the base material sheet is provided. For example, in the case where the base material sheet 1 is provided on the surface side of the decorative sheet, the thickness of the base material sheet 1 is normally about 30 to 300 µm, preferably about 50 to 200 µm. When the thickness of the base material sheet 1 falls within the above-mentioned range, further excellent three-dimensional moldability, design property and so on can be imparted to the decorative sheet. On the other hand, in the case where the surface protective layer 5 and the convex area portions 2 are laminated on the base material sheet 1, the thickness of the base material sheet 1 may be the same as in the case of the later-described support sheet 3.

[Convex Area Portion 2]

In the decorative sheet of the present invention, the convex area portions 2 are formed on the base material sheet 1, and design property is imparted to the decorative sheet by an irregularity shape formed by the convex area portions 2. The convex area portions 2 can be formed on a surface of the base material sheet 1, and can be formed on a surface of the surface protective layer 5 when the decorative sheet of the present invention includes the surface protective layer 5.

The individual convex area portions 2 may be mutually independent as shown in FIG. 1, or may be linked together at the ends as shown in FIG. 2. The convex area portions 2 are formed of a cured product of an ionizing radiation curable resin composition, and the Martens hardness of the cured product for forming the convex area portions 2 is 10 to 120 N/mm² under a temperature of 25° C. and a relative humidity of 50%. As described above, in the decorative sheet of the present invention, the convex area portions 2 are formed of a cured product of an ionizing radiation curable resin composition which has a Martens hardness in the above-mentioned specific range, and therefore the convex area portions 2 have moderate flexibility, so that the convex area portions 2 are effectively inhibited from cracking during molding. Further, the convex area portions 2 having such a Martens hardness also have moderate elasticity, and therefore even when the decorative sheet is heated and pressurized during molding, the shape of the convex area portions 2 is suitably retained, so that the decorative sheet exhibits excellent design property in the irregularity shape of the convex area portions 2 after molding. Further, the convex area portions 2 having such a Martens hardness also have excellent scratch resistance because it is formed of a cured product of an ionizing radiation curable resin composition.

The Martens hardness of the cured product for forming the convex area portions 2 may be 10 to 120 N/mm², and is preferably about 10 to 115 N/mm², under a temperature of 25° C. and a relative humidity of 50%.

Figure 5A:
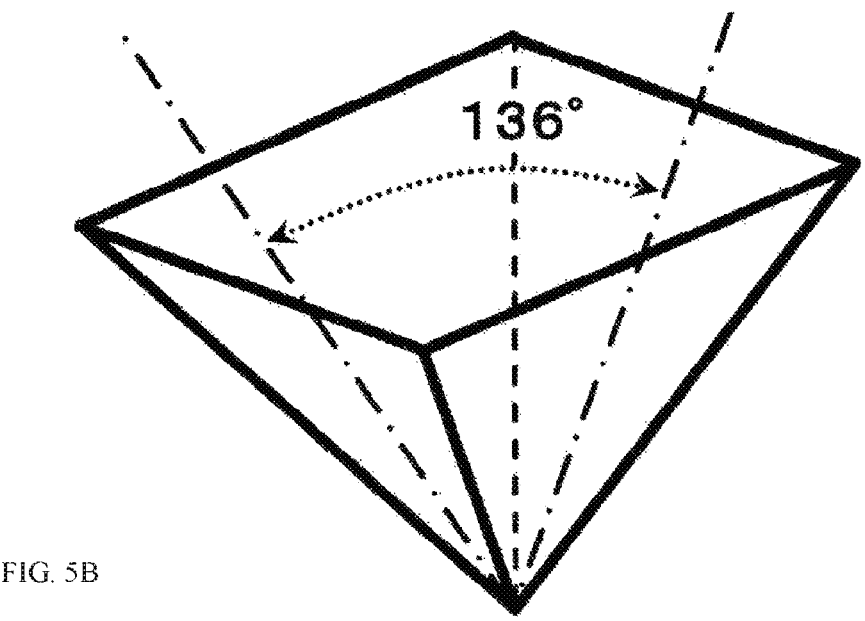
FIG. 5A is an explanatory view schematically showing a method for measuring a Martens hardness in the present invention.
Figure 5B:
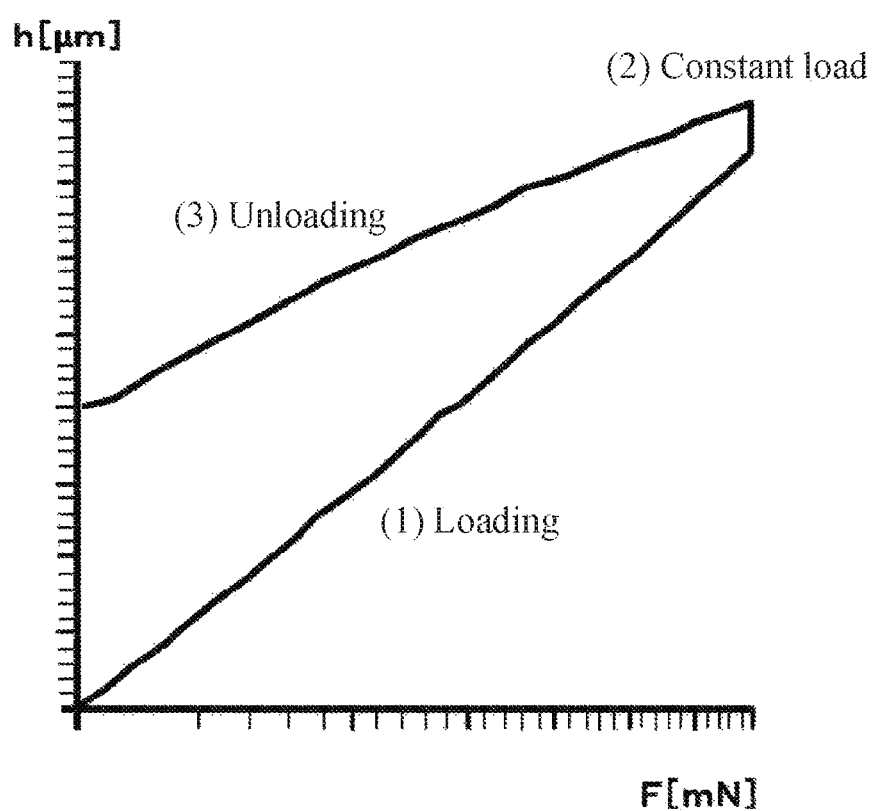
FIG. 5B is an explanatory view schematically showing a method for measuring a Martens hardness in the present invention.

In the present invention, the Martens hardness of the cured product for forming the convex area portions 2 is measured under a temperature of 25° C. and a relative humidity of 50% using a surface film property tester (PICO-DENTOR HM-500 manufactured by Fischer Instruments K.K.), and the specific measurement method is as follows. In this measurement method, a diamond indenter (Vickers indenter) with a facing angle of 136° as shown in FIG. 5A is pressed into the convex area portion 2, and a hardness is determined from a load of indentation F and a depth of indentation h (indentation depth) in accordance with the following equation (1). For press-in conditions, the convex area portion 2 of the decorative sheet is burdened with a load from 0 to 2 mN in 2 seconds, then held under a load of 2 mN for 5 seconds, and finally unloaded from 2 to 0 mN at room temperature (laboratory environment temperature) in 2 seconds as shown in FIG. 5B.

[Mathmatical Formula 1]

$$(\text{Martens Hardness}) = \frac{F}{26.43 \times h^2} \quad (1)$$

The Martens hardness of the cured product of an ionizing radiation curable resin composition can be set to fall within the above-mentioned range by adjusting the molecular weight of the ionizing radiation curable resin and the number of polymerizable functional groups contained in one molecule thereof, the types of resins other than the ionizing radiation curable resin and the types of various kinds of additives contained in the ionizing radiation curable resin composition, the added amounts thereof, and so on.

The ionizing radiation curable resin composition is composed of a resin composition containing an ionizing radiation curable resin. Hereinafter, components that form the ionizing radiation curable resin composition will be described in detail.

(Ionizing Radiation Curable Resin)

The ionizing radiation curable resin to be used for formation of the convex area portions 2 is a resin that is crosslinked and cured when irradiated with an ionizing radiation, and specific examples thereof include those in which prepolymers, oligomers and/or monomers having a polymerizable unsaturated bond or an epoxy group in the molecule are appropriately mixed. Here, the ionizing radiation means an electromagnetic wave or charged particle ray having an energy quantum capable of polymerizing or crosslinking a molecule, and normally an ultraviolet (UV) ray or an electron beam (EB) is used, but the ionizing radiations also include electromagnetic waves such as an X-ray and a γ-ray, and charged particle rays such as an α-ray and an ion beam. Among ionizing radiation curable resins, electron beam curable resins can be made solventless, and exhibit stable curing characteristics.

As the monomer to be used as an ionizing radiation curable resin, (meth)acrylate monomers having a radical-polymerizable unsaturated group in the molecule are suitable, and among them, polyfunctional (meth)acrylate monomers are preferable. The polyfunctional (meth)acrylate monomer is only required to be a (meth)acrylate monomer having two or more polymerizable unsaturated bonds in the molecule (di-or-more functional), preferably three or more polymerizable unsaturated bonds in the molecule (tri-or-more functional). Specific examples of the polyfunctional (meth)acrylate include ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalic acid neopentyl glycol di(meth)acrylate, dicyclopentanyl di(meth)acrylate, caprolactone-modified dicyclopentenyl di(meth)acrylate, ethylene oxide-modified phosphoric acid di(meth)acrylate, allylated cyclohexyl di(meth)acrylate, isocyanurate di(meth)acrylate, trimethylolpropane tri(meth)acrylate, ethylene oxide-modified trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, tris(acryloxyethyl)isocyanurate, propionic acid-modified dipentaerythritol penta(meth)acrylate, dipentaerythritol hexa(meth)acrylate, ethylene oxide-modified dipentaerythritol hexa(meth)acrylate and caprolactone-modified dipentaerythritol hexa(meth)acrylate. These monomers may be used alone, or may be used in combination of two or more thereof.

As the oligomer to be used as an ionizing radiation curable resin, (meth)acrylate oligomers having a radical-polymerizable unsaturated group in the molecule are suitable, and among them, polyfunctional (meth)acrylate oligomers having two or more polymerizable unsaturated bonds in the molecule (di-or-more functional) are preferable. Examples of the polyfunctional (meth)acrylate oligomer include polycarbonate (meth)acrylate, acrylic silicone (meth)acrylate, urethane (meth)acrylate, epoxy (meth)acrylate, polyester (meth)acrylate, polyether (meth)acrylate, polybutadiene (meth)acrylate, silicone (meth)acrylate, and oligomers having a cation-polymerizable functional group in the molecule (e.g. novolac-type epoxy resins, bisphenol-type epoxy resins, aliphatic vinyl ethers, aromatic vinyl ethers and so on). Here, the polycarbonate (meth)acrylate is not particularly limited as long as it has a carbonate bond on the polymer main chain, and has a (meth)acrylate group at the end or side chain, and the polycarbonate (meth)acrylate can be obtained by esterifying a polycarbonate polyol with (meth)acrylic acid. The polycarbonate (meth)acrylate may be, for example, urethane (meth)acrylate having a polycarbonate backbone. The urethane (meth)acrylate having a polycarbonate backbone is obtained by, for example, reacting a polycarbonate polyol, a polyvalent isocyanate compound and hydroxy (meth)acrylate. The acrylic silicone (meth)acrylate can be obtained by radical-copolymerizing a silicone macro-monomer with a (meth)acrylate monomer. The urethane (meth)acrylate can be obtained by, for example, esterifying a polyurethane oligomer with (meth) acrylic acid, the polyurethane oligomer being obtained by reaction of a polyether polyol or a polyester polyol with a polyisocyanate. The epoxy (meth)acrylate can be obtained by, for example, reacting (meth)acrylic acid with an oxirane ring of a relatively low-molecular-weight bisphenol-type epoxy resin or novolac-type epoxy resin to perform esterification. Carboxyl-modified epoxy (meth)acrylate obtained by partially modifying the epoxy (meth)acrylate with a dibasic carboxylic anhydride can also be used. For example, the polyester (meth)acrylate can be obtained by esterifying hydroxyl groups of a polyester oligomer with (meth)acrylic acid, the polyester oligomer being obtained by condensation of a polyvalent carboxylic acid and a polyhydric alcohol and having a hydroxyl group at each of both ends, or by esterifying a hydroxyl group at the end of an oligomer with (meth)acrylic acid, the oligomer being obtained by adding an alkylene oxide to a polyvalent carboxylic acid. The polyether (meth)acrylate can be obtained by esterifying a hydroxyl group of a polyether polyol with (meth)acrylic acid. The polybutadiene (meth)acrylate can be obtained by adding (meth)acrylic acid to the side chain of a polybutadiene oligomer. The silicone (meth)acrylate can be obtained by adding (meth)acrylic acid to the end or side chain of a silicone having a polysiloxane bond on the main chain. Urethane (meth)acrylate oligomers are preferable among the above-mentioned resins for effectively inhibiting the convex area portions 2 from cracking during molding, and further improving scratch resistance and design property in the irregularity shape of the convex area portions after molding. These oligomers may be used alone, or may be used in combination of two or more thereof. In this specification, the "(meth)acrylate" means an "acrylate" or a "methacrylate", and the same applies to other similar other terms.

These ionizing radiation curable resins may be used alone, or may be used in combination of two or more thereof.

Among these ionizing radiation curable resins, the use of at least one of the urethane (meth)acrylate and the polyester (meth)acrylate is preferable and the use of the urethane (meth)acrylate is more preferable for further effectively inhibiting the convex area portions 2 from cracking during molding of the decorative sheet, and further improving scratch resistance and design property in the irregularity shape of the convex area portions after molding. Hereinafter, the urethane (meth)acrylate that is suitably used as an ionizing radiation curable resin in formation of the convex area portions 2 will be described in detail.

<Urethane (Meth)Acrylate>

The urethane (meth)acrylate is not particularly limited as long as it has a urethane bond on the polymer main chain, and a (meth)acrylate at the end or on the side chain. Such urethane (meth)acrylate can be obtained by, for example, esterifying a polyurethane oligomer with (meth)acrylic acid, the polyurethane oligomer being obtained by reaction of a polyether polyol or a polyester polyol with a polyisocyanate. In the urethane (meth)acrylate, the number of functional groups per one molecule is preferably 2 to 12 for improvement of crosslinking and curing. The urethane (meth)acrylate is preferably a polyfunctional urethane (meth)acrylate having two or more (meth)acrylates at the end or on the side chain. The ionizing radiation curable resin composition to be used for formation of the convex area portions 2 may further contain other (meth)acrylate in addition to a urethane meth (acrylate). The urethane (meth)acrylates may be used alone, or may be used in combination of two or more thereof.

The molecular weight of the urethane (meth)acrylate is not particularly limited, but it is, for example, 1.000 or more, preferably 2,000 or more in terms of a weight average molecular weight. The upper limit of the weight average molecular weight of the urethane (meth)acrylate is not particularly limited, but it is, for example, 100,000 or less, preferably 50,000 or less for controlling the viscosity so as not to be excessively high.

The weight average molecular weight of the urethane (meth)acrylate in this specification is a value obtained by performing measurement using a gel permeation chromatography method using polystyrene as a standard substance.

When a urethane (meth)acrylate is used, the content of the urethane (meth)acrylate in the ionizing radiation curable resin composition to be used for formation of the convex area portions 2 is not particularly limited as long as the effect of the present invention is exhibited, but the content of the urethane (meth)acrylate is preferably about 5 to 50% by mass, more preferably about 20 to 50% by mass for further improving the moldability of the decorative sheet.

In addition to the ionizing radiation curable resin, various kinds of additives can be blended in the convex area portion 2 according to desired properties to be imparted to the convex area portion 2. Examples of the additives include weather resistance improving agents such as ultraviolet absorbers and light stabilizers, abrasion resistance improvers, polymerization inhibitors, crosslinkers, infrared absorbers, antistatic agents, bondability improvers, leveling agents, thixotropy imparting agents, coupling agents, plasticizers, antifoaming agents, fillers, solvents and colorants. The additives can be appropriately selected from those that are commonly used. As the ultraviolet absorber and light stabilizer, a reactive ultraviolet absorber and light stabilizer having a polymerizable group such as a (meth)acryloyl group in the molecule can also be used.

The thickness of the convex area portion 2 after curing is not particularly limited, but it is preferably 10 μm or more, more preferably about 10 to 100 μm, further preferably about 20 to 40 μm. When the thickness of the convex area portion 2 after curing falls within the above-mentioned range, the convex area portions 2 can be further effectively inhibited from cracking during molding of the decorative sheet, and scratch resistance and design property in the irregularity shape of the convex area portions after molding can be further improved.

Formation of the convex area portions 2 is performed by, for example, preparing the ionizing radiation curable resin composition, and applying and crosslinking/curing the ionizing radiation curable resin composition. The viscosity of the ionizing radiation curable resin composition may be a viscosity which ensures that an uncured resin layer can be formed on the base material sheet 1 for forming the convex area portions 2 (on a surface of the base material sheet 1 or a surface of the surface protective layer 5) by the later-described application method. In the present invention, an uncured resin layer is formed by applying a prepared application liquid onto the base material layer 1 (a surface of the base material layer 1 or a surface of the surface protective layer 5) using a known method such as gravure coating, bar coating, roll coating, reverse roll coating, comma coating or a shaping method using ionizing radiation curable resin with embossing cylinder as described in Japanese Patent Laid-open Publication No. 2002-240078. The uncured resin layer formed in this manner is irradiated with an ionizing radiation such as an electron beam or an ultraviolet ray to cure the uncured resin layer, so that the convex area portions 2 are formed. Here, when an electron beam is used as the ionizing radiation, an accelerating voltage thereof can be appropriately selected according to a resin to be used and a thickness of the layer, but the accelerating voltage is normally about 70 to 300 kV.

In application of an electron beam, the transmission capacity increases as the accelerating voltage becomes higher, and therefore when a resin that is easily degraded by irradiation of an electron beam is used in the base material sheet 1 or surface protective layer 5 situated under the convex area portions 2, an accelerating voltage is selected so that the transmission depth of the electron beam is substantially equal to the thickness of the convex area portion 2. Accordingly, the base material sheet 1 or surface protective layer 5 situated under the convex area portions 2 can be inhibited from being excessively irradiated with an electron beam, so that degradation of the layers by an excessive electron beam can be minimized. The amount of radiation is preferably an amount with which the crosslinking density of the protective layer 2 is saturated, and the amount of radiation is selected within a range of normally 5 to 300 kGy (0.5 to 30 Mrad), preferably 10 to 50 kGy (1 to 5 Mrad). Further, the electron beam source is not particularly limited, and various kinds of electron beam accelerators can be used such as, for example, those of Cockcroft-Walton type, van de graaff type, tuned transformer type, insulated core transformer type, linear type, dynamitron type and high frequency type. When an ultraviolet ray is used as the ionizing radiation, it is practical to radiate light including an ultraviolet ray having a wavelength of 190 to 380 nm. The ultraviolet ray source is not particularly limited, and examples thereof include high-pressure mercury lamps, low-pressure mercury lamps, metal halide lamps, carbon arc lamps and ultraviolet-ray emitting diodes (LED-UV).

In formation of the later-described surface protective layer 5 and the convex area portions 2 when the surface protective layer 5 is formed of an ionizing radiation curable resin, an ionizing radiation curable resin composition for forming the convex area portions 2 is laminated on an ionizing radiation curable resin composition for forming the surface protective layer 5 while the ionizing radiation curable resin composition for forming the surface protective layer 5 is uncured or semicured, and an ionizing radiation is then applied under conditions which ensure that the ionizing radiation curable resin compositions of the surface protective layer 5 and the convex area portions 2 can be cross-linked and cured, whereby the surface protective layer 5 and the convex area portions 2 can be formed in one ionizing radiation application step. Alternatively, the ionizing radiation may be applied two times, i.e. during formation of the surface protective layer 5 and during formation of the convex area portions 2. In the case where the ionizing radiation is applied two times, i.e. during formation of the surface protective layer 5 and during formation of the convex area portions 2, the ionizing radiations to be used in the respective steps may be the same, or different. More specifically, for example, the surface protective layer 5 and the convex area portions 2 are cured by applying an electron beam, or the surface protective layer 5 is cured by applying an electron beam and the convex area portions 2 are cured by applying an ultraviolet ray.

The area of one convex area portion 2 is not particularly limited, and is appropriately set according to a desired design to be imparted to the decorative sheet, but it is, for example, 100 mm$^2$ or less, preferably 50 mm$^2$ or less, more preferably 20 mm$^2$ or less, further preferably 10 mm$^2$ or less, still further preferably 5 mm$^2$ or less. As described above, in the decorative sheet of the present invention, the cured product of an electron radiation curable resin composition for forming the convex area portions 2 has a Martens hardness in the above-mentioned specific range, so that even when the area of one convex area portion 2 is 2 mm$^2$ or more, the convex area portions 2 are effectively inhibited from cracking during molding of the decorative sheet, and the decorative sheet exhibits excellent scratch resistance and design property in the irregularity shape of the convex area portion after molding. In the case where the later-described surface protective layer 5 is formed of an ionizing radiation curable resin, the decorative sheet has excellent moldability and scratch resistance even when the area of one convex area portion 2 is small. The lower limit of the area is not particularly limited, but it is 0.01 mm$^2$ or more for ensuring that an irregularity pattern is visually recognized. The areas of a plurality of convex area portions 2 may be the same, or mutually different. In this specification, the area of the convex area portion 2 etc. is an area when the convex area portion 2 etc. is viewed in the lamination direction of the decorative sheet. More specifically, the area is a value that is measured by a measurement method as described later.

Figure 7A:
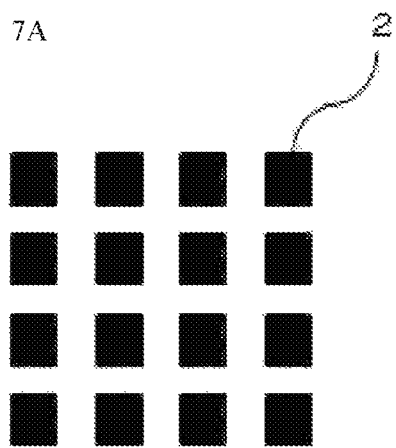
FIG. 7A is a schematic view showing an example of convex area portions when the decorative sheet of the present invention is viewed in the lamination direction.
Figure 7B:
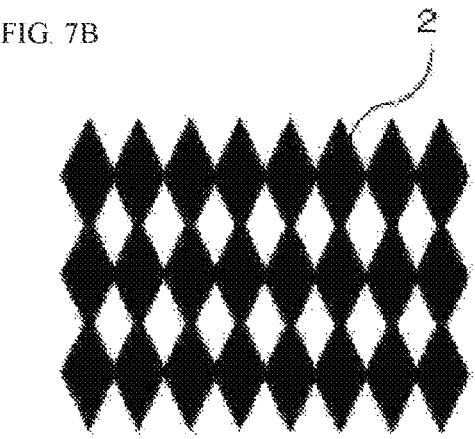
FIG. 7B is a schematic view showing an example of convex area portions when the decorative sheet of the present invention is viewed in the lamination direction.
Figure 7C:
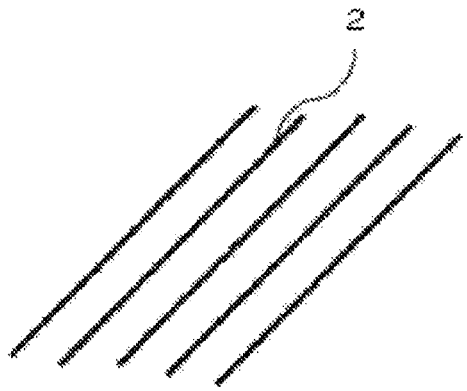
FIG. 7C is a schematic view showing an example of convex area portions when the decorative sheet of the present invention is viewed in the lamination direction.
Figure 7D:
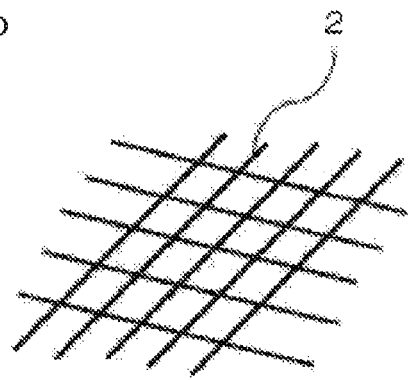
FIG. 7D is a schematic view showing an example of convex area portions when the decorative sheet of the present invention is viewed in the lamination direction.

FIGS. 7A to 7D are schematic views each showing an example of the convex area portions 2 when the decorative sheet of the present invention is viewed in the lamination direction. In the present invention, the convex area portions 2 may be mutually independent as shown in, for example, FIGS. 7A and 7C, or the convex area portions 2 may be linked together in a part of the horizontal direction of the decorative sheet (a direction perpendicular to the lamination direction of the decorative sheet) as in FIG. 2 and FIGS. 7B and 7D. In FIG. 7D, one tetragonal pattern as a minimum unit is formed by four linear convex area portions 2. Further, the convex area portions 2 may be formed on the whole of a surface of the decorative sheet on which the convex area portions 2 are formed (a surface of the base material sheet 1 or a surface of the surface protective layer 5 on which the convex area portions 2 are formed) (not illustrated).

The ratio of the total area of the convex area portions 2 to the area of the whole surface of the decorative sheet (e.g. ratio of the total area of the convex area portions 2 to the area of the whole surface of the decorative sheet on which the convex area portions 2 are formed (e.g. a surface of the base material sheet 1 or a surface of the surface protective layer 5 on which the convex area portions 2 are formed) is not particularly limited, but it is normally 90% or less, preferably 60% or less, more preferably 55% or less. As described above, in the decorative sheet of the present invention, the cured product of an electron radiation curable resin composition for forming the convex area portions 2 has a Martens hardness in the above-mentioned specific range, so that even when the ratio of the total area of the convex area portions 2 to the area of the whole surface of the decorative sheet is in the above-mentioned range, the convex area portions 2 are effectively inhibited from cracking during molding, and the decorative sheet exhibits excellent scratch resistance and design property in the irregularity shape of the convex area portion after molding.

Figure 6A:
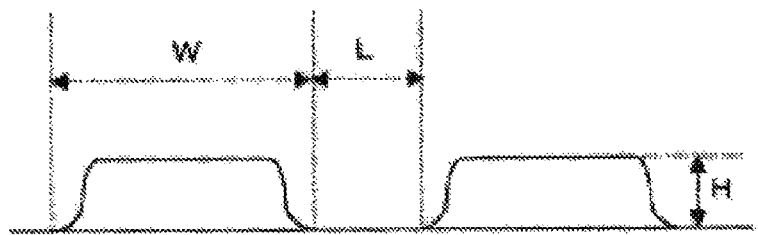
FIG. 6A is a schematic sectional view of one aspect of convex area portions of a decorative sheet of the present invention.
Figure 6B:
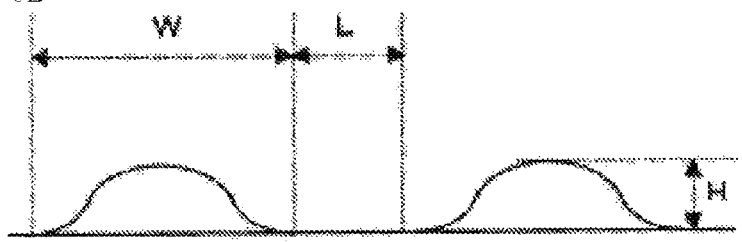
FIG. 6B is a schematic sectional view of one aspect of convex area portions of a decorative sheet of the present invention.

In the present invention, the area of one convex area portion 2 (area when the decorative sheet is viewed in the lamination direction), the ratio of the total area of the convex area portions 2 to the area of the whole surface of the decorative sheet, the distance between the convex area portions 2 and the thickness of the convex area portion 2 are measured specifically in the following manner. For example, the convex area portions 2 have a cross-sectional shape as in FIG. 6A which is formed by applying an ionizing radiation curable resin composition onto a surface of the base material sheet 1 or the surface protective layer 5 and allowing the composition to hang down, or a cross-sectional shape as in FIG. 6B which is intentionally formed. In the present invention, irrespective of whether the convex area portions 2 have the former or latter cross-sectional shape, the area of one convex area portion 2 is the area of a part at which the convex area portion 2 is in contact with the base material sheet 1 or the surface protective layer 5 (area of a part denoted by W), and the total area is the total of the areas of the portions. The ratio of the total area of the convex area portions 2 to the area of the whole surface of the decorative sheet can be determined by dividing the total area by the area of the whole surface of the decorative sheet. The distance between adjacent convex area portions 2 is a distance (part denoted by L) between end portions where the end portion is the outer edge of a part at which the convex area portion 2 is in contact with the base material sheet 1 or the surface protective layer 5. For the convex area portion 2 that is partially linked to other convex area portions 2, the distance between adjacent convex area portions 2 is a distance between convex area portions 2 that are not directly linked together, among mutually adjacent convex area portions 2. The thickness of the convex area portion 2 (height of the convex area portion) is the height of the highest part (part denoted by H) of the convex area portion 2, i.e. a difference in height between the convex area portion 2 and the base material sheet 1 or surface protective layer 5 that is in contact with the convex area portion 2.

The shape of the convex area portion 2 is not particularly limited, and is preferably a shape such as a circular shape, an elliptical shape, a triangular shape, a tetragonal shape (e.g. a shape in FIG. 7A or 7B), a pentagonal to decagonal shape, a star shape, a linear shape (e.g. a shape in FIG. 7C or 7D), an arc shape, a geometric pattern or a character-like shape. The shapes of the convex area portions 2 may be the same, or mutually different. The design presented by the convex area portions 2 may be a regular pattern shape with the convex area portions 2 arranged regularly, or may be an irregular pattern. An irregular pattern is preferable because an excellent tactile impression, an excellent mat feeling, and an excellent glossy feeling and excellent design property are exhibited, and a regular pattern with convex area portions arranged regularly is preferable because stress is hard to be concentrated on a specific part during decorative molding, so that cracking in the irregularity pattern on the surface is harder to occur.

The pattern formed by the convex area portions 2 as a whole is not particularly limited, and preferred examples thereof include geometric patterns of circular shapes, elliptical shapes, polygonal shapes, line drawings, polka dots, stripes, lattices and so on; characters; woodgrain patterns; bamboo grain patterns; rift patterns; tiling patterns; brick masonry patterns; texture patterns; and leather drawing patterns. One or more of these patterns may be used according to a use purpose.

[Support Sheet 3]

The support sheet 3 is a layer which is provided as necessary for the purpose of, for example, improving moldability in the decorative sheet of the present invention. In the case where the decorative sheet is used for decoration of a molded article with a complicated shape in which the decorative sheet is required to have high elongation, it is preferable to provide the support sheet 3. When the base material sheet 1 is formed of a resin excellent in moldability, it is not required to provide the support sheet 3.

The support sheet 3 is formed of a resin sheet (resin film) that serves as a support member. The resin component to be used in the support sheet 3 is not particularly limited, and may be appropriately selected according to three-dimensional moldability and compatibility with an injected resin layer, but a thermoplastic resin is preferable. Specific examples of the thermoplastic resin include acrylonitrile-butadiene-styrene resins (hereinafter, sometimes referred to as "ABS resins"); acrylonitrile-styrene-acrylic acid ester resins; acrylic resins; polyolefin-based resins such as polypropylene and polyethylene: polycarbonate resins; vinyl chloride-based resins; and polyethylene terephthalate (PET) resins. Among them, ABS resins are preferable from the viewpoint of three-dimensional moldability. The resin components that form the support sheet 3 may be used alone, or may be used in combination of two or more thereof. The support sheet 3 may be formed of a single-layer sheet of the above-mentioned resin, or may be formed of a multi-layer sheet of the same resin or different resins.

One or both of the surfaces of the support sheet 3 may be subjected to a physical or chemical surface treatment such as an oxidation method or a roughening method as necessary for improving adhesion with adjacent layers. Examples of the oxidation method that is carried out as a surface treatment of the support sheet 3 include corona discharge treatment, plasma treatment, chromium oxidation treatment, flame treatment, hot air treatment and ozone/ultraviolet treatment methods. Examples of the roughening method that is carried out as a surface treatment of the support sheet 3 include sand blasting methods and solvent treatment methods. The surface treatment is appropriately selected according to a type of resin component for forming the support sheet 3, but a corona discharge treatment method is preferable from the viewpoint of an effect, handling characteristics and so on.

The support sheet 3 may be colored by blending a colorant etc., coated for arranging the color, or provided with a pattern for giving design characteristics.

The thickness of the support sheet 3 is not particularly limited, and is appropriately set according to a use purpose of the decorative sheet, etc., but it is normally about 50 to 800 μm, preferably about 100 to 600 μm, further preferably about 200 to 500 μm. When the thickness of the support sheet 3 falls within the above-mentioned range, further excellent three-dimensional moldability, design characteristics and so on can be imparted to the decorative sheet.

[Surface Protective Layer 5]

The surface protective layer 5 is a layer that is provided between the base material sheet 1 and the convex area portions 2 as necessary for the purpose of, for example, improving the scratch resistance and chemical resistance of the decorative resin molded article. When the decorative sheet of the present invention includes the surface protective layer 5, the convex area portions 2 are formed on the surface protective layer 5.

The resin for forming the surface protective layer 5 is not particularly limited as long as it improves the scratch resistance and chemical resistance of the decorative resin molded article and is capable of forming the convex area portions 2, and examples thereof include thermoplastic resins, thermosetting resins and ionizing radiation curable resins, with ionizing radiation curable resins being preferable from the viewpoint of scratch resistance and chemical resistance. The thermoplastic resin and thermosetting resin are not particularly limited, and preferred examples thereof include those shown as an example for the base material sheet 1. The ionizing radiation curable resin is not particularly limited, and examples thereof include those shown as an example for the convex area portion 2. When the surface protective layer 5 is formed from an ionizing radiation curable resin, the surface protective layer 5 can be formed as an uncured layer in the state of a decorative sheet, and then cured after being laminated with a molded resin layer, but since in the decorative sheet of the present invention, the convex area portions 2 are formed from a cured product of an ionizing radiation curable resin composition, it is preferable for the sake of convenience that the surface protective layer 5 is also formed as a cured product of an ionizing radiation curable resin composition in the state of a decorative sheet. Various kinds of additives as shown as an example for the convex area portion 2 can be blended in the surface protective layer 5 according to desired properties to be imparted to the surface protective layer 5.

Studies conducted by the present inventors show that when convex area portions of a crosslinked and cured ionizing radiation curable resin composition are formed on a base material sheet formed of an acrylic resin etc. as in, for example, the decorative sheet disclosed in Patent Document 2, not only uncured convex area portions but also the base material sheet is irradiated with an ionizing radiation in the process of forming the convex area portions, so that the base material sheet may be degraded. As a result, the bending processability of the decorative sheet is deteriorated, so that there may be a problem in the moldability of the decorative sheet, such as occurrence of cracking in the decorative sheet at the time of performing trimming to remove an unnecessary portion after preliminary molding in, for example, an insert molding method. When a plurality of mutually independent convex area portions are formed, such a problem is prominent because the base material sheet is exposed to the surface of the decorative sheet at a part where the convex area portion is not formed. On the other hand, in a decorative sheet having a configuration in which the surface protective layer 5 formed of a cured product of an ionizing radiation curable resin composition is provided on the base material sheet 1, and convex area portions 2 are formed on a surface of the surface protective layer 5, the surface protective layer 5 is hard to be degraded by an ionizing radiation applied in formation of the convex area portions, and therefore cracking etc. is hard to occur in the surface protective layer 5 during molding, so that excellent moldability is exhibited. Further, since the surface protective layer 5 and the convex area portions 2 are formed from a cured product of an ionizing radiation curable resin composition, a decorative sheet which also has excellent scratch resistance can be obtained.

When the surface protective layer 5 is formed from a cured product of an ionizing radiation curable resin composition, it is preferable to use a polycarbonate (meth)acrylate as an ionizing radiation curable resin contained in the composition for further improving moldability. It is further preferable to use a urethane (meth)acrylate in addition to the polycarbonate (meth)acrylate for improving scratch resistance, chemical resistance and other surface properties.

<Polycarbonate (Meth)Acrylate>

The polycarbonate (meth)acrylate is not particularly limited as long as it has a carbonate bond on the polymer main chain, and a (meth)acrylate at the end or on the side chain as described in explanation of the convex area portion 2. In the (meth)acrylate, the number of functional groups per one molecule is preferably 2 to 6 for improvement of crosslinking and curing. The polycarbonate (meth)acrylate is preferably a polyfunctional polycarbonate (meth)acrylate having two or more (meth)acrylates at the end or on the side chain. The polycarbonate (meth)acrylates may be used alone, or may be used in combination of two or more thereof.

The polycarbonate polyol to be used for production of a polycarbonate (meth)acrylate is a polymer having a carbonate bond in the polymer main chain, and having 2 or more, preferably 2 to 50, further preferably 3 to 50 hydroxyl groups at the end or side chain. A typical method for producing the polycarbonate polyol is a method using a polycondensation reaction of a diol compound (A), a polyhydric alcohol (B) of tri- or more valence, and a compound (C) as a carbonyl component.

The diol compound (A) which is used as a raw material of the polycarbonate polyol is represented by the general formula HO—$R^1$—OH. Here, $R^1$ is a divalent hydrocarbon with a carbon number of 2 to 20, and may include an ether bond in the group. $R^1$ is, for example, a linear or branched alkylene group, a cyclohexylene group or a phenylene group.

Specific examples of the diol compound include ethylene glycol, 1,2-propylene glycol, diethylene glycol, dipropylene glycol, triethylene glycol, polyethylene glycol, neopentyl glycol, 1,3-propanediol, 1,4-butanediol, 1,5-pentanediol, 3-methyl-1,5-pentanediol, 1,6-hexanediol, 1,8-octanediol, 1,3-bis(2-hydroxyethoxy)benzene, 1,4-bis(2-hydroxyethoxy)benzene, neopentyl glycol, 1,4-cyclohexanediol and 1,4-cyclohexanedimethanol. These diols may be used alone, or may be used in combination of two or more thereof.

Examples of the polyhydric alcohol (B) of tri- or more valence which is used as a raw material of the polycarbonate polyol include alcohols such as trimethylolpropane, trimethylolethane, pentaerythritol, ditrimethylolpropane, dipentaerythritol, glycerin and sorbitol. The polyhydric alcohol of tri- or more valence may be an alcohol having a hydroxyl group with 1 to 5 equivalents of ethylene oxide, propylene oxide or other alkylene oxide added to the hydroxyl group of the polyhydric alcohol. These polyhydric alcohols may be used alone, or may be used in combination of two or more thereof.

The compound (C) as a carbonyl component which is used as a raw material of the polycarbonate polyol is any compound selected from a carbonic diester, phosgene and an equivalent thereof. Specific examples of the compound include carbonic acid diesters such as dimethyl carbonate, diethyl carbonate, diisopropyl carbonate, diphenyl carbonate, ethylene carbonate and propylene carbonate; phosgene; halogenated formic acid esters such as methyl chloroformate, ethyl chloroformate and phenyl chloroformate. These compounds may be used alone, or may be used in combination of two or more thereof.

The polycarbonate polyol is synthesized subjecting a diol compound (A), a polyhydric alcohol (B) of tri- or more valence, and a compound (C) as a carbonyl component to a polycondensation reaction under general conditions. The charged molar ratio of the diol compound (A) and the polyhydric alcohol (B) may be set to, for example, 50:50 to 99:1. The charged molar ratio of the compound (C) as a carbonyl component to the diol compound (A) and the polyhydric alcohol (B) may be set to, for example, 0.2 to 2 equivalents to hydroxyl groups of the diol compound and the polyhydric alcohol.

The equivalent number (eq./mol) of hydroxyl groups existing in the polycarbonate polyol after the polycondensation reaction with the above-mentioned charged ratio is, for example, 3 or more, preferably 3 to 50, further preferably 3 to 20 on average in one molecule. When such an equivalent number is satisfied, a necessary amount of (meth)acrylate groups are formed through an esterification reaction as described later, and moderate flexibility is imparted to the polycarbonate (meth)acrylate resin. The terminal functional groups of the polycarbonate polyol are usually OH groups, but some of them may be carbonate groups.

The method for producing a polycarbonate polyol as described above is described in, for example, Japanese Patent Laid-open Publication No. 64-1726. The polycarbonate polyol can also be produced through an ester exchange reaction of a polycarbonate diol and a polyhydric alcohol of tri- or more valence as described in Japanese Patent Laid-open Publication No. 3-181517.

The molecular weight of the polycarbonate (meth)acrylate is not particularly limited, but it is, for example, 5.000 or more, preferably 10,000 or more in terms of a weight average molecular weight. The upper limit of the weight average molecular weight of the polycarbonate (meth)acrylate is not particularly limited, but it is, for example, 100,000 or less, preferably 50,000 or less for controlling the viscosity so as not to be excessively high. The weight average molecular weight of the polycarbonate (meth)acrylate is preferably 10,000 to 50,000, further preferably 10,000 to 20,000 for further improving the effect of presenting a textural generous low-gloss feeling, and moldability.

The weight average molecular weight of the polycarbonate (meth)acrylate in this specification is a value obtained by performing measurement using a gel permeation chromatography method using polystyrene as a standard substance.

In the case where a polycarbonate (meth)acrylate is used, the content of the polycarbonate (meth)acrylate in the ionizing radiation curable resin composition to be used for formation of the surface protective layer 5 is not particularly limited as long as the effect of the present invention is exhibited, but the content of the urethane (meth)acrylate is preferably 50% by mass or more, more preferably 80% by mass or more, further preferably 85% by mass or more for further improving the moldability of the decorative sheet.

<Urethane (Meth)Acrylate>

As a urethane (meth)acrylate to be used for formation of the surface protective layer 5, one described for the convex area portion 2 can be used. The molecular weight of the urethane (meth)acrylate to be used for formation of the surface protective layer 5 is not particularly limited, but it is, for example, 5,000 or more, preferably 10,000 or more in terms of a weight average molecular weight, and the upper limit thereof is, for example, 100,000 or less, preferably 50,000 or less for controlling the viscosity so as not to be excessively high.

When the polycarbonate (meth)acrylate and the urethane (meth)acrylate are used in combination in the ionizing radiation curable resin composition to be used for formation of the surface protective layer 5, the mass ratio thereof (polycarbonate (meth)acrylate:urethane (meth)acrylate) is preferably about 50:50 to 99:1, more preferably about 80:20 to 99:1, further preferably about 85:15 to 99:1.

For improving adhesion between the surface protective layer 5 and the above-mentioned convex area portion 2 in the decorative sheet of the present invention, the content of a silicone component in the ionizing radiation curable resin composition for forming the surface protective layer 5 is preferably 5% by mass or less, more preferably 3% by mass or less, further preferably 1% by mass or less, and it is most preferable that a silicone component is substantially not contained. The silicone component in the ionizing radiation curable resin composition is a component having in the molecule a structure having an organic group and formed by alternate bonding of silicon and oxygen, and specific examples thereof include reactive silicones obtained by introducing a reactive organic group such as an amino group, a vinyl group, an epoxy group, a carboxyl group, an acryl group or a methacryl group to the side chain or the end of a silicone oil mainly composed of a polysiloxane backbone, non-reactive silicones obtained by introducing a non-reactive organic group such as an alkyl group, an ether group or a higher fatty acid to the side chain or the end of the silicone oil, and silicone-modified resins obtained by modifying the side chain or the end of an organic resin, an ionizing radiation curable resin or the like with silicone.

The thickness of the surface protective layer 5 is not particularly limited, but it is preferably 1000 μm or less, more preferably about 1 to 50 μm, further preferably about 1 to 30 μm, still further preferably about 1 to 10 μm. When the thickness of the surface protective layer 5 falls within the above-mentioned range, the decorative sheet has excellent moldability, and sufficient properties as a surface protective layer, such as scratch resistance are obtained. When the surface protective layer 5 is formed from an ionizing radiation curable resin composition, an ionizing radiation can be uniformly applied, and therefore can be uniformly cured, thus being advantageous in terms of economy.

In the present invention, the surface protective layer 5 can be formed in the following manner: the above-mentioned resin for forming the surface protective layer 5 is applied onto a layer situated under the surface protective layer 5 using a known method such as gravure coating, bar coating, roll coating, reverse roll coating or comma coating, preferably gravure coating, in such a manner that the above-mentioned thickness is obtained. When the surface protective layer 5 is formed from an ionizing radiation curable resin, an uncured resin layer can be cured in the same manner as described above for the convex area portion 2.

[Primer Layer 6]

The primer layer 6 is a layer that is provided as necessary for the purpose of, for example, improving adhesion between the surface protective layer 5 and a layer situated thereunder.

As a primer composition that forms the primer layer 6, one having a urethane resin, a (meth)acrylic resin, a (meth)acryl-urethane copolymer resin, a vinyl chloride-vinyl acetate copolymer, a polyester resin, a butyral resin, chlorinated polypropylene, chlorinated polyethylene or the like as a binder resin is preferably used, and these resins can be used alone, or in combination of two or more thereof. Among these resins, urethane resins, (meth)acrylic resins and (meth)acryl-urethane copolymer resins are preferable.

As the urethane resin, a polyurethane having a polyol (polyhydric alcohol) as a main agent and an isocyanate as a crosslinker (curing agent) can be used. As the polyol, one having two or more hydroxyl groups in the molecule, for example polyester polyol, polyethylene glycol, polypropylene glycol, acryl polyol, polyether polyol or the like is used. As the isocyanate, polyvalent isocyanate having two or more isocyanate groups in the molecule: an aromatic isocyanate such as 4,4-diphenylmethane diisocyanate, or aliphatic (or cycloaliphatic) isocyanates such as hexamethylene diisocyanate, isophorone diisocyanate, hydrogenated tolylene diisocyanate or hydrogenated diphenylmethane diisocyanate is used. A urethane resin and a butyral resin can be mixed to form the primer layer.

From the viewpoint of adhesion with the base material sheet 1 after crosslinking, it is preferable to combine acryl polyol or polyester polyol as a polyol and hexamethylene diisocyanate or 4,4-diphenylmethane diisocyanate as a crosslinker, and particularly, it is preferable to use acryl polyol and hexamethylene diisocyanate in combination.

Examples of the (meth)acrylic resin include homopolymers of a (meth)acrylic acid ester, copolymers of two or more different (meth)acrylic acid ester monomers, and copolymers of a (meth)acrylic acid ester and other monomer, and specifically, (meth)acrylic resins composed of homopolymers or copolymers including (meth)acrylic acid esters such as polymethyl (meth)acrylate, polyethyl (meth)acrylate, polypropyl (meth)acrylate, polybutyl (meth)acrylate, methyl (meth)acrylate-butyl (meth)acrylate copolymers, ethyl (meth)acrylate-butyl (meth)acrylate copolymers, ethylene-methyl (meth)acrylate copolymers and styrene-methyl (meth)acrylate copolymers are suitably used.

For example, the (meth)acryl-urethane copolymer resin is preferably an acryl-urethane (polyester urethane) block copolymer-based resin. As the curing agent, the various kinds of isocyanates described above are used. Preferably, the acrylturethane ratio (mass ratio) in the acryl-urethane (polyester urethane) block copolymer-based resin is adjusted to fall within the range of preferably 9/1 to 1/9, more preferably 8/2 to 2/8.

Primer layer 6 is formed by a normal coating method such as gravure coating, gravure reverse coating, gravure offset coating, spinner coating, roll coating, reverse roll coating, kiss coating, wheeler coating, dip coating, solid coating with a silk screen, wire bar coating, flow coating, comma coating, pour coating, blushing or spray coating, or a transfer coating method using a primer composition. Here, the transfer coating method is a method in which a coating film of the primer layer or the adhesive layer is formed on a thin sheet (film base material), and thereafter the intended surface of the layer in the decorative sheet is coated with the coating film.

The thickness of the primer layer 6 is not particularly limited, but it is preferably 0.1 µm or more. When the thickness is 0.1 µm or more, an effect of preventing cracking, rupture, whitening and the like of the surface protective layer 5 is exhibited. On the other hand, it is preferable that the thickness of the primer layer 6 is 10 µm or less because the coating film is stably dried and cured in application of the primer layer 6, and therefore three-dimensional moldability is not varied.

[Decorative Layer 4]

The decorative layer 4 is a layer that is provided as necessary for the purpose of imparting decorativeness to the resin molded article. When the decorative sheet of the present invention includes the surface protective layer 5, the decorative layer 4 can be provided on the convex area portion 2 side of the base material sheet 1, and when the base material sheet 1 is transparent (or translucent), the decorative layer 4 can be provided on a side opposite to the convex area portions 2. The decorative layer 4 may be patterned or unfigured, or may be partially patterned and partially unfigured.

The decorative layer 4 is formed by, for example, printing various patterns using ink and a printer. The pattern formed by the decorative layer 4 is not particularly limited, and examples thereof include woodgrain patterns, rift patterns resembling a surface of rock, such as marble patterns (e.g., travertine marble patterns), textile patterns resembling texture or fabric patterns, tiling patterns and brick masonry patterns, and also patterns formed by combining these patterns, such as those of wooden mosaics and patchworks. These patterns are formed by multicolor printing with usual process colors of yellow, red, blue and black, and also formed multicolor printing etc. with spot colors, which is performed using plates of individual colors that constitute patterns.

As ink to be used in the decorative layer 4, one obtained by appropriately mixing a binder with a colorant such as a pigment or a dye, an extender, a solvent, a stabilizer, a catalyst, a curing agent and so on is used. The binder is not particularly limited, and examples thereof include polyurethane resins, vinyl chloride-vinyl acetate-based copolymer resins, vinyl chloride-vinyl acetate-acryl-based copolymer resins, chlorinated polypropylene-based resins, acryl-based resins, polyester-based resins, polyamide-based resins, butyral-based resins, polystyrene-based resins, nitrocellulose-based resins and cellulose acetate-based resins. These resins may be used alone, or may be used in combination of two or more thereof.

The colorant is not particularly limited, and examples thereof include inorganic pigments such as carbon black (tusche), iron black, titanium white, antimony white, chrome yellow, titanium yellow, rouge, cadmium red, ultramarine and cobalt blue, organic pigments or dyes such as quinacridone red, isoindolinone yellow and phthalocyanine blue, metallic pigments composed of scale-like foil pieces of aluminum, brass or the like, and pearlescent (pearl) pigments composed of scale-like foil pieces of titanium dioxide-coated mica, basic lead carbonate or the like.

The thickness of the decorative layer 4 is not particularly limited, but it is, for example, about 1 to 30 µm, preferably about 1 to 20 µm.

The decorative layer 4 may be a thin metal film layer. Examples of the metal for forming the thin metal film layer include tin, indium, chromium, aluminum, nickel, copper, silver, gold, platinum, zinc and an alloy containing at least one of these metals. The method for forming a thin metal film layer is not particularly limited, and examples thereof include a vapor deposition method such as a vacuum vapor deposition method, a sputtering method and an ion plating method each using the above-mentioned metal. For improving adhesion with the adjacent layer, the surface or back surface of the thin metal film layer may be provided with a primer layer using a known resin.

[Masking Layer]

A masking layer may be provided as necessary for the purpose of, for example, suppressing a change and variation in color of the decorative sheet (not illustrated).

The masking layer is provided normally for suppressing an adverse influence on the color tome and pattern of the decorative resin molded article by a sheet provided on the back surface side of the decorative layer 4, and the molded resin layer 8, and is therefore formed as a transparent layer in general.

The masking layer is formed using an ink composition obtained by appropriately mixing a binder with a colorant such as a pigment or a dye, an extender, a solvent, a stabilizer, a plasticizer, a catalyst, and a curing agent. The ink composition for forming the masking layer is appropriately selected from those to be used in the pattern layer 4.

The masking layer is desirable to be formed as a so called solid printing layer with its thickness usually set to about 1 to 20 μm.

[Adhesive Layer 7]

The adhesive layer 7 may be provided on the back surface of the decorative sheet (on a side opposite to the convex area portions 2) as necessary for the purpose of, for example, improving adhesion between the decorative sheet and the molded resin layer 8. The resin for forming the adhesive layer 7 is not particularly limited as long as it can improve adhesion and bondability between the decorative sheet and the molded resin layer 8, and examples thereof include thermoplastic resins and thermosetting resins. Examples of the thermoplastic resin include acrylic resins, acryl-modified polyolefin resins, chlorinated polyolefin resins, vinyl chloride-vinyl acetate copolymers, thermoplastic urethane resins, thermoplastic polyester resins, polyamide resins and rubber-based resins. The thermoplastic resins may be used alone, or may be used in combination of two or more thereof. Examples of the thermosetting resin include urethane resins and epoxy resins. The thermosetting resins may be used alone, or may be used in combination of two or more thereof.

The adhesive layer 7 is not a layer that is necessarily needed, but it is preferable to provide the adhesive layer 7 when it is conceivable that the decorative sheet of the present invention is applied to a decoration method in which the decorative sheet is bonded onto a previously provided resin molded body, such as a vacuum press-bonding method as described later. When the decorative sheet is used in a vacuum press-bonding method, it is preferable to form the adhesive layer 7 using, among various resins described above, one that is commonly used as a resin which exhibits bondability under pressure or heating.

2. Decorative Resin Molded Article

Figure 8:
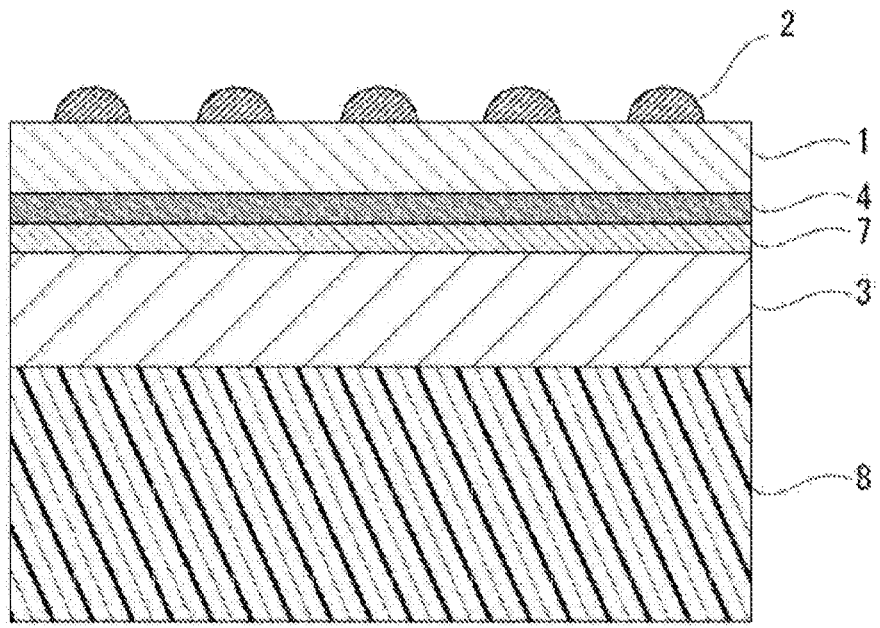
FIG. 8 is a schematic sectional view of one example of a decorative resin molded article of the present invention.

The decorative resin molded article of the present invention is formed by integrating the molded resin layer 8 with the decorative sheet of the present invention. Specifically, the decorative resin molded article of the present invention includes a laminated body in which at least a molded resin layer, a base material sheet, and an convex area portion formed of a cured product of an ionizing radiation curable resin composition, which is formed on the base material sheet are laminated in this order, wherein the cured product of an ionizing radiation curable resin composition has a Martens hardness of 10 to 120 N/mm$^2$ under a temperature of 25° C. and a relative humidity of 50%. In the decorative resin molded article of the present invention, the decorative sheet may be further provided with at least one of the above-mentioned support sheet 3, decorative layer 4, surface protective layer 5, primer layer 6, masking layer, adhesive layer 7 and so on as necessary. As one aspect of the laminated structure of the decorative resin molded article of the present invention, FIG. 8 shows a schematic sectional view of one example of a decorative sheet in which a molded resin layer, a support sheet, an adhesive layer, a decorative layer, a base material sheet and convex area portions are laminated in this order, the decorative sheet being obtained by laminating on the molded resin layer 8 a decorative sheet having the configuration shown in FIG. 3.

The decorative resin molded article of the present invention is prepared by various injection molding methods such as an insert molding method, an injection molding simultaneous decorating method, a blow molding method and a gas injection molding method using, for example, the decorative sheet of the present invention. Among these injection molding methods, an insert molding method and an injection molding simultaneous decorating method are preferable. The decorative resin molded article of the present invention can also be prepared by a decorative molding method in which the decorative sheet of the present invention is bonded onto a previously provided three-dimensional resin molded body (molded resin layer), such as a vacuum press-bonding method. In the decorative resin molded article of the present invention, the convex area portions 2 are formed of a cured product of an ionizing radiation curable resin composition having a Martens hardness in the above-mentioned specific range, and therefore the convex area portions 2 have moderate flexibility and elasticity, so that the convex area portions 2 are effectively inhibited from cracking and deforming even when the decorative resin molded article is produced by one of the above-mentioned methods involving heating and pressurization. Particularly in the injection molding method, the convex area portions 2 of the decorative sheet of the present invention are pressed against an injection molding die to receive a large pressure, but even in this case, the convex area portions 2 in the decorative resin molded article of the present invention properly maintain a shape before molding.

In the insert molding method, first the decorative sheet of the present invention is vacuum-molded into a molded article surface shape beforehand using a vacuum molding die (off-line preliminary molding) in a vacuum molding step, and then an unnecessary portion is trimmed off as necessary to obtain a molded sheet. The molded sheet is inserted into an injection molding die, the injection molding die is closed, a fluidized resin is injected into the die, and solidified to integrate the decorative sheet with the outer surface of the resin molded body in parallel to injection molding, thereby producing a decorative resin molded article.

More specifically, the decorative resin molded article of the present invention is produced by an insert molding method including:

a vacuum molding step of molding the decorative sheet of the present invention into a three-dimensional shape beforehand by a vacuum molding die;

a trimming step of trimming off an unnecessary portion of the vacuum-molded decorative sheet to obtain a molded sheet, and an integration step of inserting the molded sheet into an injection molding die, closing the injection molding die, and injecting a fluidized resin into the injection molding die to integrate the resin with the molded sheet.

In the vacuum molding step in the insert molding method, the decorative sheet may be heated and molded. The heating temperature here is not particularly limited, and may be appropriately selected according to a type of the resin that forms the decorative sheet, or a thickness of the decorative sheet, and it may be normally about 120 to 200° C. In the integration step, the temperature of the fluidized resin is not particularly limited, and it may be normally about 180 to 320° C.

In the injection molding simultaneous decorating method, the decorative sheet of the present invention is disposed in a female die also serving as a vacuum molding die provided with a suction hole for injection molding, and is subjected to preliminary molding in this female die (in-line preliminary molding), the injection molding die is then closed, a fluidized resin is injected and filled into the die, and solidified to integrate the decorative sheet of the present invention with the outer surface of the resin molded body in parallel to injection molding, thereby producing a decorative resin molded article.

More specifically, the decorative resin molded article of the present invention is produced by an injection molding simultaneous decorating method including the following steps:

a preliminary molding step of placing the decorative sheet of the present invention in such a manner that a surface of the decorative sheet on the base material sheet 1 side (on a side opposite to the convex area portions 2) faces a molding surface of a movable die, the molding surface having a predetermined shape, then heating and softening the decorative sheet, and vacuum-suctioning the decorative sheet from the movable die side to adhere the softened decorative sheet along the molding surface of the movable die, thereby preliminarily molding the decorative sheet:

an integration step of closing the movable die having the decorative sheet adhered along the molding surface, and a fixed die, then injecting and filling a fluidized resin into a cavity formed by both the dies, solidifying the resin to form a resin molded body, and laminating and integrating the resin molded body and the decorative sheet with each other; and a taking-out step of separating the movable die from the fixed die to take out the resin molded body with all the layers of the decorative sheet laminated thereon.

In the preliminary molding step of the injection molding simultaneous decorating method, the heating temperature of the decorative sheet is not particularly limited, and may be appropriately selected according to a type of the resin that forms the decorative sheet, or a thickness of the decorative sheet, and it may be normally about 70 to 130° C. In the injection molding step, the temperature of the fluidized resin is not particularly limited, and it may be normally about 180 to 320° C.

In the vacuum press-bonding method, first the decorative sheet of the present invention and a resin molded body are placed in a vacuum press-bonding machine including a first vacuum chamber situated on the upper side and a second vacuum chamber situated on the lower side in such a manner that the decorative sheet is on the first vacuum chamber side and the resin molded body is on the second vacuum chamber side, and that the base material sheet side of the decorative sheet (a side opposite to the convex area portions) faces the resin molded body side. The two vacuum chambers are then evacuated. The resin molded body is placed on a lift table that is provided on the second vacuum chamber side and is capable of moving up and down. Then, the first vacuum chamber is pressurized, and the molded body is abutted against the decorative sheet with the lift table, and by using a pressure difference between the two vacuum chambers, the decorative sheet is bonded to the surface of the resin molded body while being stretched. Finally, the two vacuum chambers are released to atmospheric pressure, and an unnecessary portion of the decorative sheet is trimmed off, so that the decorative resin molded article of the present invention can be obtained.

Preferably, the vacuum press-bonding method includes a step of heating the decorative sheet for softening the decorative sheet to improve the moldability thereof before the step of abutting the molded body against the decorative sheet. The vacuum press-bonding method including such a step may be referred to particularly as a vacuum heating and press-bonding method. The heating temperature in the step may be appropriately selected according to a type of the resin that forms the decorative sheet, or a thickness of the decorative sheet, and it may be normally about 60 to 200° C.

As described above, in a decorative sheet having a configuration in which the surface protective layer 5 formed of a cured product of an ionizing radiation curable resin composition is provided on the base material sheet 1, and convex area portions 2 are formed on the surface protective layer 5, the surface protective layer 5 is hard to be degraded by an ionizing radiation applied in formation of the convex area portions, and therefore cracking etc. is hard to occur in the surface protective layer 5 during molding, so that excellent moldability is exhibited. Particularly, conventional decorative sheets including convex area portions are easily cracked in bending, so that a problem is apt to occur at the time of performing trimming as described in the explanation of the insert molding method and the vacuum press-bonding method, and thus a decorative sheet having a configuration in which the surface protective layer 5 formed of a cured product of an ionizing radiation curable resin composition is provided on the base material sheet 1, and convex area portions 2 are formed on the surface protective layer 5 is useful when used in a molding method including performing trimming during molding.

In the decorative resin molded article of the present invention, a resin appropriate to a use may be selected to form the molded resin layer. The molded resin for forming the molded resin layer may be either a thermoplastic resin or a thermosetting resin.

Specific examples of the thermoplastic resin include polyolefin-based resins such as polyethylene and polypropylene, ABS resins, styrene resins, polycarbonate resins, acrylic resins and vinyl chloride-based resins. These thermoplastic resins may be used alone, or may be used in combination of two or more thereof.

Examples of the thermosetting resin include urethane resins and epoxy resins. These thermosetting resins may be used alone, or may be used in combination of two or more thereof.

In the decorative resin molded article of the present invention, the convex area portion is effectively inhibited from cracking after the decorative sheet is molded, and excellent scratch resistance and design property in the irregularity shape of the convex area portion are exhibited after molding. Therefore, the decorative resin molded article of the present invention can be used for, for example, interior materials or exterior materials of vehicles such as automobiles; fittings such as window frames and door frames; interior materials of buildings such as walls, floors and ceilings; housings of household electric appliances such as television receivers and air conditioners; and containers etc.

EXAMPLES

Hereinafter, the present invention will be described in detail by way of examples and comparative examples. However, the present invention is not limited to examples.

Examples 1A to 4A and Comparative Examples 1A to 2A (Preparation of Decorative Sheet)

Example 1A

A decorative layer (thickness: 1 µm) containing a polybutyl methacrylate/vinyl chloride-vinyl acetate copolymer as a binder, and an adhesive layer (thickness: 10 µm)

composed of polymethyl methacrylate and a two-liquid curable urethane resin-based adhesive were sequentially laminated on the back surface of a base material sheet composed of a 75 μm-thick colorless and transparent acrylic resin sheet mainly composed of polymethyl methacrylate. Next, a support sheet (thickness: 400 μm) composed of an ABS resin was laminated onto the adhesive layer by dry lamination. Next, an ionizing radiation curable resin composition as described below was applied to the surface of the base material sheet in a plane-view pattern shape in which a large number of circular convex area portions were arranged (area of one convex area portion: about 0.3 mm²; ratio of areas of convex area portions in base material sheet surface: about 45%). Next, an ultraviolet ray was applied onto the convex area portions under the condition of 160 W/cm to cure the convex area portions while the plate shape of a printing plate was maintained. By the above procedure, a three-dimensional molding decorative sheet with a large number of 30 μm-thick convex area portions formed on a base material sheet was obtained.
(Ionizing Radiation Curable Resin Composition)

Mixture of 20% by mass of a urethane acrylate oligomer (weight average molecular weight: about 2000), 60% by mass of a difunctional acrylate monomer, 5% by mass of a photosensitive compound, 5% by mass of a photopolymerization initiator and 10% by mass of a filler and a pigment.

Example 2A

Except that an ionizing radiation curable resin composition as described below was used, the same procedure as in Example 1A was carried out to obtain a three-dimensional molding decorative sheet.
(Ionizing Radiation Curable Resin Composition)

Mixture of 30% by mass of a urethane acrylate oligomer (weight average molecular weight: about 8000), 50% by mass of a trifunctional acrylate monomer, 5% by mass of a photosensitive compound, 5% by mass of a photopolymerization initiator and 10% by mass of a filler and a pigment.

Example 3A

Except that an ionizing radiation curable resin composition as described below was used, the same procedure as in Example 1A was carried out to obtain a three-dimensional molding decorative sheet.
(Ionizing Radiation Curable Resin Composition)

Mixture of 20% by mass of a urethane acrylate oligomer (weight average molecular weight: about 5000), 60% by mass of a difunctional acrylate monomer, 5% by mass of a photosensitive compound, 5% by mass of a photopolymerization initiator and 10% by mass of a filler and a pigment.

Example 4A

Except that an ionizing radiation curable resin composition as described below was used, the same procedure as in Example 1A was carried out to obtain a three-dimensional molding decorative sheet.
(Ionizing Radiation Curable Resin Composition)

Mixture of 20% by mass of a urethane acrylate oligomer (weight average molecular weight: about 8000), 60% by mass of a difunctional acrylate monomer, 5% by mass of a photosensitive compound, 5% by mass of a photopolymerization initiator and 10% by mass of a filler and a pigment.

Comparative Example 1A

Except that an ionizing radiation curable resin composition as described below was used, the same procedure as in Example 1A was carried out to obtain a three-dimensional molding decorative sheet.
(Ionizing Radiation Curable Resin Composition)

Mixture of 10% by mass of a polyester acrylate oligomer (weight average molecular weight: about 2000), 68% by mass of a difunctional acrylate monomer, 10% by mass of a thermoplastic resin, 5% by mass of a photosensitive compound, 5% by mass of a photopolymerization initiator and 2% by mass of a filler and a pigment.

Comparative Example 2A

Except that an ionizing radiation curable resin composition as described below was used, the same procedure as in Example 1A was carried out to obtain a three-dimensional molding decorative sheet.
(Ionizing Radiation Curable Resin Composition)

Mixture of 40% by mass of a urethane acrylate oligomer (weight average molecular weight: about 5000), 40% by mass of a difunctional acrylate monomer, 5% by mass of a photosensitive compound, 5% by mass of a photopolymerization initiator and 10% by mass of a filler and a pigment.
Measurement of Martens Hardness The Martens hardness is measured using a surface film property tester (PICODENTOR HM-500 manufactured by Fischer Instruments K.K.), and the specific measurement method is as follows. In this measurement method, a diamond indenter (Vickers indenter) with a facing angle of 136° as shown in FIG. 5A was pressed into the convex area portion of the decorative sheet in each of Examples and Comparative Examples under an environment at a temperature of 25° C. and a relative humidity of 50%, and a hardness was determined from a load of indentation F and a depth of indentation h in accordance with the following equation (2). For press-in conditions, the convex area portion 2 of the decorative sheet was burdened with a load from 0 to 2 mN in 2 seconds, then held under a load of 2 mN for 5 seconds, and finally unloaded from 2 to 0 mN at room temperature (laboratory environment temperature) in 2 seconds as shown in FIG. 5B.

[Mathematical Formula 2]

$$(\text{Martens Hardness}) = \frac{F}{26.43 \times h^2} \quad (2)$$

(Preparation of Decorative Resin Molded Article)

The decorative sheet obtained in each of Examples 1A to 4A and Comparative Examples 1A and 2A was fixed to a fixation frame, and heated by a heater at about 300° C. until the temperature of the decorative sheet reached about 160° C. A decorative resin molded article was obtained by subjecting the heated and softened decorative sheet to a vacuum molding step, a trimming step, and an injection molding step using an ABS resin as a molding resin at a temperature of about 240° C.
Observation of Cracks in Convex area portions (Evaluation of Moldability)

Cracks in convex area portions of the decorative resin molded article obtained from the decorative sheet in each of Examples 1A to 4A and Comparative Examples 1A and 2A were visually observed. Samples having no cracks even in portions elongated by 300% were rated ⊙, samples having no cracks in portions elongated by up to 250% were rated ○, samples having no cracks in portions elongated by up to 200% were rated Δ, and samples having no cracks in portions elongated by up to 150% were rated x. The results are shown in Table 1.

Evaluation of Design Property in Irregularity Shape

The surface of the decorative resin molded article obtained from the decorative sheet in each of Examples 1A to 4A and Comparative Examples 1A and 2A was touched with the hand, and the irregularity impression was evaluated. As evaluation criteria, samples giving a clear irregularity impression were rated ⊙, samples giving an irregularity impression were rated ○, samples giving a slight irregularity impression were rated Δ, and samples giving no irregularity impression at all were rated x. The results are shown in Table 1.

Measurement of Surface Roughness

The arithmetic mean roughness Ra of the surface of the decorative resin molded article obtained from the decorative sheet in each of Examples 1A to 4A and Comparative Examples 1A and 2A was measured in the following manner. The measurement was performed in accordance with JIS B 0601:2001 using a surface roughness measurement device (trade name "HANDYSURF E-35A") manufactured by TOKYO SEIMITSU CO., LTD. A roughness curve having a length L was folded at the center line, a total area obtained from each roughness curve and the centerline was divided by the length L, and the value thus obtained was expressed in micrometers (μm). The results are shown in Table 1.

Scratch Resistance (Steel Wool)

The surface of the decorative resin molded article obtained from the decorative sheet in each of Examples 1A to 4A and Comparative Examples 1A and 2A was scraped back and forth ten times under a load of 1.5 kgf using a steel wool (#0000), and the surfaces of convex area portions were visually observed, and evaluated in accordance with the following criteria. The results are shown in Table 1.

⊙: The scar on the convex area portion disappears soon after scraping, and thus scratch resistance is high.

○: The scar on the convex area portion disappears after scraping, and thus scratch resistance is high.

Δ: The scar slightly remains on the convex area portion after scraping, and thus scratch resistance is slightly low, but there is no problem in practical use.

x: The scar remains on the convex area portion after scraping, and thus scratch resistance is low, and there is a problem in practical use.

hardness of the cured product of an ionizing radiation curable resin composition for forming convex area portions was 10 to 120 N/mm$^2$, the convex area portions were effectively inhibited from cracking under heat and pressure during molding. These decorative sheets exhibited an excellent irregularity impression after molding, had a large value of arithmetic mean roughness Ra, and was also excellent in scratch resistance.

On the other hand, in the decorative sheet of Comparative Example 1A there the cured product for forming convex area portions had a large Martens hardness of 140) N/mm$^2$, the convex area portions were cracked even in low-elongated portions during molding. The decorative sheet of Comparative Example 1A did not give an irregularity impression after molding, and had a small arithmetic mean roughness Ra. On the other hand, the decorative sheet of Comparative Example 2A where the cured product for forming convex area portions had a small Martens hardness of 5 N/mm$^2$ was very poor in scratch resistance after molding.

Reference Examples 1 to 10 and Comparative Reference Example 1

(Preparation of Decorative Sheet Before Formation of Convex Area Portions)

A decorative layer (thickness: 5 μm) was formed on an ABS resin film (thickness: 400 μm) as a base material by gravure printing using an ink containing a vinyl chloride-vinyl acetate-acryl-based copolymer resin. Next, a primer layer (thickness: 3 μm) was provided on the decorative layer by gravure printing using a primer composition. The primer composition is a composition containing 89.9 parts by mass of an acryl polyol resin (weight average molecular weight: 8000), 10.1 parts by mass of a polyurethane resin (weight average molecular weight: 6000) and 7 parts by mass of hexamethylene diisocyanate. Next, an electron beam curable resin having a composition as shown in Table 2 was applied by bar coating in such a manner that the thickness of the resin composition after curing would be 10 μm or 5 μm, so that a surface protective layer composed of an uncured electron beam curable resin was formed. Next, the uncured surface protective layer was irradiated with an electron beam with an accelerating voltage of 165 kV and a radiation dose of 50 kGy (5 Mrad), so that the electron beam curable resin was cured to obtain a decorative sheet before formation of convex area portions, in which a base material sheet, a decorative layer, a primer layer and a surface protective layer were laminated in this order. For the decorative sheet

TABLE 1

| | Example 1A | Example 2A | Example 3A | Example 4A | Comparative Example 1A | Comparative Example 2A |
|---|---|---|---|---|---|---|
| Martens hardness of cured product for forming convex area portions (N/mm$^2$) | 112 | 12 | 82 | 70 | 140 | 5 |
| Evaluation of irregularity impression | ○ | ⊙ | ⊙ | ○ | X | ○ |
| Arithmetic mean roughness Ra (μm) | 1.1 | 1.6 | 1.8 | 1.2 | 0.8 | 1.0 |
| Evaluation of moldability (cracks in convex area portions) | ○ | ⊙ | ⊙ | ○ | X | ○ |
| Evaluation of scratch resistance | ○ | ○ | ○ | ○ | ⊙ | X |

It is evident from the results shown in Table 1 that in the decorative sheets of Examples 1A to 4A where Martens before formation of convex area portions, the following test 1 was conducted. For Comparative Reference Example 1, a laminated film of an acrylic resin base material (thickness: 75 µm) and an ABS resin film (thickness: 400 µm) was directly provided to test 1. The results are shown in Table 3.

Reference Examples 11 to 20, Examples 1B to 10B and Comparative Reference Example 2

(Preparation of Decorative Sheet Including Formation of Convex Area Portions)

Next, the surface protective layer of the decorative sheet before formation of convex area portions, which was obtained in each of Reference Examples 1 to 10, was printed with dots (area: about 3 $mm^2$) composed of ultraviolet-ray curable resin G or H described in Table 4 and having a diameter of 2 mm by screen printing in such a manner that the coating thickness would be 30 µm, so that a plurality of uncured convex area portions were formed. Next, the uncured convex area portions were irradiated with an ultraviolet ray with an integrated light amount of 600 mJ/$cm^2$, so that ultraviolet-ray curable resin was cured to obtain a decorative sheet in which a base material sheet, a decorative layer, a primer layer, a surface protective layer and convex area portions were laminated in this order. In the obtained decorative sheet, the ratio of the total area of convex area portions to the area of the whole surface of the surface protective layer was 35%. For the decorative sheet, the following test 2 was conducted. The results are shown in Table 4. For Comparative Reference Example 2, convex area portions were formed on an acrylic resin base material.

TABLE 2

| Electron beam curable resin | Resin formulation | Resin blending ratio (mass ratio) |
|---|---|---|
| EB1 | A/B/C | 64.7/32.3/3 |
| EB2 |  | 48.5/48.5/3 |
| EB3 |  | 29.1/67.9/3 |
| EB4 | A/B/D | 64.7/32.3/3 |
| EB5 | E/F | 30/70 |

The electron beam curable resins in Table 2 are as follows.
A: difunctional polycarbonate acrylate (weight average molecular weight: 10,0000)
B: difunctional polycarbonate acrylate (weight average molecular weight: 20,000)
C: tetrafunctional urethane acrylate (weight average molecular weight: 500)
D: difunctional silicone-modified urethane acrylate (weight average molecular weight: 1,000)
E: tetrafunctional urethane acrylate (weight average molecular weight: 8,000)
F: trifunctional acrylate monomer (weight average molecular weight: about 300)

<Test 1: Test for Decorative Sheet Before Formation of Convex Area Portions>
Scratch Resistance (Nail Scratching)
The surface of the decorative sheet was scratched back and forth ten times with nails, and the surface was visually observed, and evaluated in accordance with the following criteria. The results are shown in Table 3.
◯: The trace disappears after scratching, and thus scratch resistance is high.
Δ: The trace slightly remains after scratching, and thus scratch resistance is slightly low, but there is no problem in practical use.
x: The trace remains after scratching, and thus scratch resistance is low, and there is a problem in practical use.
Scratch Resistance (Steel Wool)
The surface of the decorative sheet was scraped back and forth ten times under a load of 1.5 kgf using a steel wool (#0000), and the surface was visually observed, and evaluated in accordance with the following criteria. The results are shown in Table 3.
◯: The scar disappears after scraping, and thus scratch resistance is high.
Δ: The scar slightly remains after scraping, and thus scratch resistance is slightly low, but there is no problem in practical use.
x: The scar remains after scraping, and thus scratch resistance is low, and there is a problem in practical use.
Tension Characteristic under High Temperature
For examining moldability, the decorative sheet was heated for 60 seconds in an oven set at 160° C., drawn at 1000 mm/sec using a Tensilon universal tester, and evaluated in accordance with the following criteria. The results are shown in Table 3.
⊙: The sheet is elongated by 150% or more, and thus the tension characteristic under a high temperature is very good.
◯: The sheet is elongated by 120% or more, and thus the tension characteristic under a high temperature is good.
Δ: The sheet is elongated by 100% or more, and thus the tension characteristic under a high temperature is not bad, and there is no problem in practical use.
x: The sheet is not elongated by 100%, and thus the tension characteristic under a high temperature is bad, and there is a problem in practical use.
Bending Characteristic
For examining moldability, the decorative sheet was placed under normal temperature, bent by the hand, and evaluated in accordance with the following criteria. The results are shown in Table 3.
◯: Even when the sheet is bent at 180°, the bent portion is not cracked.
Δ: When the sheet is bent at 90°, the bent portion is not cracked, and there is no problem in practical use.
x: When the sheet is bent at 90°, the bent portion is cracked, and there is a problem in practical use.

TABLE 3

|  |  | Reference Example 1 | Reference Example 2 | Reference Example 3 | Reference Example 4 | Reference Example 5 | Reference Example 6 | Reference Example 7 | Reference Example 8 | Reference Example 9 | Reference Example 10 | Comparative Reference Example 1 |
|---|---|---|---|---|---|---|---|---|---|---|---|---|
| Surface protective layer | Electron beam curable resin | EB1 | | EB2 | | EB3 | | EB4 | | EB5 | | Acrylic resin base material |
|  | Coating thickness (µm) | 5 | 10 | 5 | 10 | 5 | 10 | 5 | 10 | 5 | 10 | |
|  | Scratch resistance (nail scratching) | ◯ | ◯ | Δ | Δ | Δ | Δ | ◯ | ◯ | ◯ | ◯ | X |

TABLE 3-continued

| | | Reference Example 1 | Reference Example 2 | Reference Example 3 | Reference Example 4 | Reference Example 5 | Reference Example 6 | Reference Example 7 | Reference Example 8 | Reference Example 9 | Reference Example 10 | Comparative Reference Example 1 |
|---|---|---|---|---|---|---|---|---|---|---|---|---|
| Test 3 | Scratch resistance (steel wool) | ○ | ○ | ○ | ○ | ○ | ○ | ○ | ○ | ○ | ○ | X |
| | Tension Characteristic under High Temperature | ○ | ○ | ⊙ | ⊙ | ⊙ | ⊙ | ○ | ○ | Δ | Δ | X |
| | Bending Characteristic | ○ | ○ | ○ | ○ | ○ | ○ | ○ | ○ | Δ | Δ | ○ |

As shown in table 3, the decorative sheet before formation of convex area portions in each of Reference Examples 1 to 10 using an electron beam curable resin in the surface protective layer was satisfactory or had no problem in practical use in both the bending characteristic and the tension characteristic under a high temperature, each of which serving as an indication of moldability. Particularly, the decorative sheet in each of Reference Examples 1 to 8 using a polyfunctional polycarbonate (meth)acrylate in the surface protective layer was excellent in both the bending characteristic and the tension characteristic under a high temperature. On the other hand, the decorative sheet in Comparative Reference Example 1 using a laminated film of an acrylic resin base material and an ABS resin film was poor in tension characteristic under a high temperature. Further, the decorative sheet in Comparative Reference Example 1 was poor in scratch resistance.

<Test 2: Test for Decorative Sheet Provided with Convex Area Portions>

Evaluation of Adhesion

The surface of the decorative sheet provided with convex area portions was notched so as to draw 11 lines in a longitudinal direction and 11 lines in a lateral direction at intervals of 2 mm over a length of 5 cm using a cutter, so that a notch was formed in the shape of a checkerboard having 100 squares in total with 10 squares in a longitudinal direction and 10 squares in a lateral direction. Cellotape (registered trademark, No. 405-1P) manufactured by Nichiban Co., Ltd. was press-bonded onto the notch, and then rapidly peeled off to evaluate the adhesion of the convex area portions. The evaluation criteria are as follows. The results are shown in Table 4.

○: Not delaminated.
x: Delaminated.

Scratch Resistance (Nail Scratching)

The surface of the decorative sheet provided with convex area portions was scratched back and forth ten times with nails, and the surface was visually observed, and evaluated in accordance with the following criteria. The results are shown in Table 4.

○: The trace disappears after scratching, and thus scratch resistance is high.

Δ: The trace slightly remains after scratching, and thus scratch resistance is slightly low, but there is no problem in practical use.

x: The trace remains after scratching, and thus scratch resistance is low, and there is a problem in practical use.

Scratch Resistance (Steel Wool)

The surface of the decorative sheet was scraped back and forth ten times under a load of 1.5 kgf using a steel wool (#0000), and the surface was visually observed, and evaluated in accordance with the following criteria. The results are shown in Table 4.

○: The scar disappears after scraping, and thus scratch resistance is high.

Δ: The scar slightly remains after scraping, and thus scratch resistance is slightly low, but there is no problem in practical use.

x: The scar remains after scraping, and thus scratch resistance is low, and there is a problem in practical use.

Tension Characteristic under High Temperature

For examining the moldability of the decorative sheet provided with convex area portions, the decorative sheet was heated for 120 seconds in an oven set at 170° C., and drawn at 1000 mm/sec using a Tensilon universal tester, and the surface of the decorative sheet, when it was elongated by 50%, was visually observed, and evaluated in accordance with the following criteria. The results are shown in Table 4.

⊙: The surface protective layer has no cracks in the areas situated between convex area portions, and thus the tension characteristic under a high temperature is very good.

○: The surface protective layer has cracks in about 30% of the areas situated between convex area portions, but the tension characteristic under a high temperature is good.

Δ: The surface protective layer has cracks in about 40% of the areas situated between convex area portions, but the tension characteristic under a high temperature is not bad, and there is no problem in practical use.

x: The surface protective layer has cracks in about 50% or more of the areas situated between convex area portions, and thus the tension characteristic under a high temperature is bad, and there is a problem in practical use.

Bending Characteristic

For examining the moldability of the decorative sheet provided with convex area portions, the decorative sheet was placed under normal temperature, bent by the hand, and evaluated in accordance with the following criteria. The results are shown in Table 4.

○: Even when the sheet is bent at 180°, the bent portion is not cracked.

Δ: When the sheet is bent at 90°, the bent portion is not cracked, and there is no problem in practical use.

x: When the sheet is bent at 90°, the bent portion is cracked, and there is a problem in practical use.

TABLE 4

| | | Reference Example 11 | Example 1B | Reference Example 12 | Example 2B | Reference Example 13 | Example 3B | Reference Example 14 | Example 4B | Reference Example 15 | Example 5B | Reference Example 16 | Example 6B |
|---|---|---|---|---|---|---|---|---|---|---|---|---|---|
| Electron beam curable resin in convex area portions | | G | H | G | H | G | H | G | H | G | H | G | H |
| Surface protective layer | Electron beam curable resin | EB1 | | | | EB2 | | | | EB3 | | | |
| | Coating thickness (μm) | 5 | | 10 | | 5 | | 10 | | 5 | | 10 | |
| Test 2 | Adhesion | ○ | ○ | ○ | ○ | ○ | ○ | ○ | ○ | ○ | ○ | ○ | ○ |
| | Scratch resistance (nail scratching) | ○ | ○ | ○ | ○ | Δ | Δ | Δ | Δ | Δ | Δ | Δ | Δ |
| | Scratch resistance (steel wool) | ○ | ○ | ○ | ○ | ○ | ○ | ○ | ○ | ○ | ○ | ○ | ○ |
| | Bending Characteristic | ○ | ○ | ○ | ○ | ○ | ○ | ○ | ○ | ○ | ○ | ○ | ○ |
| | Tension Characteristic under High Temperature | Δ | ⊙ | Δ | ⊙ | ○ | ⊙ | Δ | ⊙ | ⊙ | ⊙ | ○ | ⊙ |

| | | Reference Example 17 | Example 7B | Reference Example 18 | Example 8B | Reference Example 19 | Example 9B | Reference Example 20 | Example 10B | Comparative Reference Example 2 |
|---|---|---|---|---|---|---|---|---|---|---|
| Electron beam curable resin in convex area portions | | G | H | G | H | G | H | G | H | G |
| Surface protective layer | Electron beam curable resin | EB4 | | | | EB5 | | | | Acrylic resin base material |
| | Coating thickness (μm) | 5 | 5 | 10 | 10 | 5 | 5 | 10 | 10 | |
| Test 2 | Adhesion | Δ | Δ | Δ | Δ | ○ | ○ | ○ | ○ | ○ |
| | Scratch resistance (nail scratching) | ○ | ○ | ○ | ○ | ○ | ○ | ○ | ○ | X |
| | Scratch resistance (steel wool) | ○ | ○ | ○ | ○ | ○ | ○ | ○ | ○ | X |
| | Bending Characteristic | ○ | ○ | ○ | ○ | Δ | Δ | Δ | Δ | X |
| | Tension Characteristic under High Temperature | Δ | ⊙ | Δ | ⊙ | Δ | ⊙ | Δ | ⊙ | ○ |

The electron beam curable resins in Table 4 are as follows.
Resin G: Mixture of 10% by mass of a polyester-based acrylate oligomer (weight average molecular weight: about 2000), 68% by mass of a difunctional acrylate monomer, 10% by mass of a thermoplastic resin (weight average molecular weight: 5000), 5% by mass of a photosensitive compound, 5% by mass of a photopolymerization initiator and 2% by mass of a filler and a pigment.
Resin H: Mixture of 20% by mass of a urethane-based acrylate oligomer (weight average molecular weight: about 2000), 60% by mass of a difunctional acrylate monomer, 5% by mass of a photosensitive compound, 5% by mass of a photopolymerization initiator and 10% by mass of a filler and a pigment.

As shown in table 4, the decorative sheet in each of Reference Examples 11 to 20 and Examples 1B to 10B using an electron beam curable resin and an ultraviolet-ray curable resin in the surface protective layer and the convex area portion, respectively, as an ionizing radiation curable resin was satisfactory or had no problem in practical use in the bending test result and the tension characteristic under a high temperature, each of which serving as an indication of moldability, and was satisfactory or had no problem in practical use in the adhesion test. Particularly, the decorative sheet in each of Reference Examples 11 to 18 and Examples 1B to 8B using a polyfunctional polycarbonate (meth) acrylate in the surface protective layer showed an excellent bending test result. The decorative sheet in each of Reference Examples 15 and 16 and Examples 5B and 6B using in the surface protective layer the resin EB3 having a high ratio of a polycarbonate (meth)acrylate having a relatively large weight average molecular weight was excellent in tension characteristics under a high temperature. Further, the decorative sheet in each of Examples 1B to 10B using the resin H as an ultraviolet-ray curable resin in the convex area portion was excellent in tension characteristics under a high temperature. The decorative sheet in each of Reference Examples 11 to 16, Examples 1B to 6B, Reference Examples 19 and 20 and Examples 9B and 10B where a silicone component was not contained in the ionizing radiation curable resin showed an excellent adhesion test result in particular. Further, the decorative sheet in each of Reference Examples 11 and 12 and Examples 1B and 2B using in the surface protective layer a polyfunctional polycarbonate (meth)acrylate having a large weight average molecular weight of 20,000 was also excellent in terms of scratch resistance. On the other hand, it was evident that the decorative sheet in Comparative Reference example 2 where convex area portions were formed on a laminated film of an acrylic resin base material and an ABS resin film showed a bad bending test result and was thus poor in moldability because the acrylic resin was degraded by application of an ultraviolet ray.

Further, a decorative molded article was produced by performing vacuum molding and injection molding using the decorative sheet obtained in each example, reference example and comparative reference example, and the surface of the decorative resin molded article was then touched with the hand. Resultantly, decorative resin molded articles obtained using the resin H as an ultraviolet-ray curable resin in convex area portions gave a stronger irregularity impression in convex area portions as compared to decorative resin molded articles obtained using the resin G. Decorative resin molded articles were produced from decorative sheets with convex area portions formed using ultraviolet-ray curable resins I, J, K and L as shown below, and the surface of the decorative resin molded article was touched with the hand. Resultantly, all these decorative resin molded articles gave a more satisfactory irregularity impression as compared to decorative resin molded articles obtained using the resin G. Here, the Martens hardness of the convex area portion of each of the decorative sheets with convex area portions formed using resins G to L was measured by the above-mentioned method, and resultantly, the following values were obtained.

Resin G: Martens hardness 140 N/mm$^2$
Resin H: Martens hardness 112 N/mm$^2$
Resin I: Mixture of 30% by mass of a urethane acrylate oligomer (weight average molecular weight: about 8000), 50% by mass of a trifunctional acrylate monomer, 5% by mass of a photosensitive compound, 5% by mass of a photopolymerization initiator and 10% by mass of a filler and a pigment, Martens hardness 12 N/mm$^2$
Resin J: Mixture of 20% by mass of a urethane acrylate oligomer (weight average molecular weight: about 5000), 60% by mass of a difunctional acrylate monomer, 5% by mass of a photosensitive compound, 5% by mass of a photopolymerization initiator and 10% by mass of a filler and a pigment. Martens hardness 82 N/mm$^2$
Resin K: Mixture of 20% by mass of a urethane acrylate oligomer (weight average molecular weight: about 8000), 60% by mass of a difunctional acrylate monomer, 5% by mass of a photosensitive compound, 5% by mass of a photopolymerization initiator and 10% by mass of a filler and a pigment. Martens hardness 70 N/mm$^2$

DESCRIPTION OF REFERENCE SIGNS

1: Base material sheet
2: Convex area portion
3: Support sheet
4: Decorative layer
5: Surface protective layer
6: Primer layer
7: Adhesive layer
8: Molded resin layer

The invention claimed is:

1. A decorative sheet with a laminated structure comprising an convex area portion formed of a cured product of an ionizing radiation curable resin composition on a base material sheet, wherein
   the total area of the convex area portion constitutes 90% or less of the area of the whole surface of the decorative sheet,
   the convex area portion defined by one surface laminated on the base material sheet and another surface having a height, at a highest part of the convex area portion from the one surface laminated on the base material sheet, being 10 μm or more, and
   the cured product of an ionizing radiation curable resin has a Martens hardness of 10 to 120 N/mm$^2$ under a temperature of 25° C. and a relative humidity of 50%.

2. The decorative sheet according to claim 1, wherein the ionizing radiation curable resin composition in the convex area portion contains a urethane (meth)acrylate oligomer.

3. The decorative sheet according to claim 1, wherein the total area of the convex area portion constitutes 60% or less of the area of the whole surface of the decorative sheet.

4. The decorative sheet according to claim 1, wherein the plurality of convex area portions are mutually independent.

5. The decorative sheet according to claim 1, wherein the plurality of convex area portions each have an area of 100 mm$^2$ or less when viewed in the lamination direction of the decorative sheet.

6. The decorative sheet according to claim 1, comprising a surface protective layer between the base material sheet and the convex area portion, wherein the convex area portion is laminated by adhesion on a surface of the surface protective layer.

7. The decorative sheet according to claim 6, wherein the surface protective layer is formed of a cured product of an ionizing radiation curable resin composition.

8. The decorative sheet according to claim 7, wherein the content of a silicone component in the ionizing radiation curable resin composition in the surface protective layer is 5% by mass or less.

9. The decorative sheet according to claim 7, wherein the ionizing radiation curable resin composition in the surface protective layer contains a polycarbonate (meth)acrylate.

10. The decorative sheet according to claim 9, wherein the weight average molecular weight of the polycarbonate (meth)acrylate is 5000 or more.

11. The decorative sheet according to claim 9, wherein the ionizing radiation curable resin composition in the surface protective layer further contains a urethane (meth)acrylate.

12. The decorative sheet according to claim 11, wherein the mass ratio of the polycarbonate (meth)acrylate and the urethane (meth) acrylate contained in the ionizing radiation curable resin composition in the surface protective layer is 50:50 to 99:1.

13. The decorative sheet according to claim 6, wherein the thickness of the surface protective layer is 1 to 50 μm.

14. The decorative sheet according to claim 1, further comprising a decorative layer.

15. The decorative sheet according to claim 1, comprising a support sheet on the base material sheet on a side opposite to the convex area portion.

16. The decorative sheet according to claim 2, wherein the total area of the convex area portion constitutes 60% or less of the area of the whole surface of the decorative sheet.

17. A decorative resin molded article with a laminated structure in which a molded resin layer, a base material sheet, and an convex area portion formed of a cured product of an ionizing radiation curable resin composition on the base material sheet are laminated in this order, wherein
   the total area of the convex area portion constitutes 90% or less of the area of the whole surface of the decorative sheet,
   the convex area portion defined by one surface laminated on the base material sheet and another surface having a height, at a highest part of the convex area portion from the one surface laminated on the base material sheet, being 10 μm or more, and
   the cured product of an ionizing radiation curable resin composition in the convex area portion has a Martens hardness of 10 to 120 N/mm² under a temperature of 25° C. and a relative humidity of 50%.

18. The decorative resin molded article according to claim 17, comprising a surface protective layer between the base material sheet and the convex area portion, wherein the convex area portion is laminated by adhesion on a surface of the surface protective layer.

19. A decorative sheet with a laminated structure comprising an convex area portion formed of a cured product of an ionizing radiation curable resin composition on a base material sheet, wherein the total area of the convex area portion constitutes 90% or less of the area of the whole surface of the decorative sheet, the convex area portion defined by one surface contacting the base material sheet over the total area of the one surface and another surface having a height, at a highest part of the convex area portion from the one surface laminated on the base material sheet, being 10 μm or more, and the cured product of an ionizing radiation curable resin has a Martens hardness of 10 to 120 N/mm² under a temperature of 25° C. and a relative humidity of 50%.

* * * * *